United States Patent
Zheng et al.

(10) Patent No.: US 11,696,363 B2
(45) Date of Patent: Jul. 4, 2023

(54) RELEASE OF PRECONFIGURED UPLINK RESOURCE FOR SMALL DATA TRANSMISSION

(71) Applicant: QUALCOMM Incorporated, San Diego, CA (US)

(72) Inventors: Ruiming Zheng, Beijing (CN); Linhai He, San Diego, CA (US); Ozcan Ozturk, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 17/664,198

(22) Filed: May 19, 2022

(65) Prior Publication Data
US 2022/0287146 A1 Sep. 8, 2022

Related U.S. Application Data

(63) Continuation of application No. PCT/CN2020/105516, filed on Jul. 29, 2020.

(51) Int. Cl.
*H04W 76/38* (2018.01)
*H04W 76/20* (2018.01)
(Continued)

(52) U.S. Cl.
CPC ....... *H04W 76/38* (2018.02); *H04W 74/0816* (2013.01); *H04W 74/0833* (2013.01);
(Continued)

(58) Field of Classification Search
CPC .. H04W 76/30; H04W 74/0833; H04W 76/20
See application file for complete search history.

(56) References Cited

U.S. PATENT DOCUMENTS 10,999,885 B1 * 5/2021 Shih ............... H04W 76/19
2012/0099525 A1 * 4/2012 Maheshwari ....... H04W 12/041
370/328
(Continued)

FOREIGN PATENT DOCUMENTS

CN 110831197 A 2/2020
CN 111132328 A 5/2020

OTHER PUBLICATIONS

International Search Report and Written Opinion—PCT/CN2020/105516—ISA/EPO—dated Apr. 27, 2021.
(Continued)

*Primary Examiner* — Will W Lin
(74) *Attorney, Agent, or Firm* — Norton Rose Fulbright US LLP

(57) ABSTRACT

In one aspect, a method of wireless communication includes receiving, by a user equipment (UE), a preconfigured uplink resource (PUR) configuration message indicating a PUR configuration for small data transmissions. The method also includes determining, by the UE, a PUR configuration release trigger for the PUR configuration. The method further includes receiving, by the UE, a PUR configuration release message configured to release the PUR configuration. In another aspect, a method of wireless communication includes transmitting, by a network entity, a preconfigured uplink resource (PUR) configuration message indicating a PUR configuration for small data transmissions. The method also includes determining, by the network entity, a PUR configuration release trigger for the PUR configuration. The method further includes transmitting, by the network entity, a PUR configuration release message configured to release the PUR configuration. Other aspects are described and claimed.

29 Claims, 11 Drawing Sheets

(51) Int. Cl.
*H04W 74/08* (2009.01)
*H04W 76/30* (2018.01)

(52) U.S. Cl.
CPC ....... *H04W 74/0841* (2013.01); *H04W 76/20* (2018.02); *H04W 76/30* (2018.02)

(56) References Cited

U.S. PATENT DOCUMENTS

| | | | |
|---|---|---|---|
| 2020/0383085 A1* | 12/2020 | Shih | H04W 56/005 |
| 2021/0112526 A1* | 4/2021 | Dhanda | H04W 76/11 |
| 2021/0400567 A1* | 12/2021 | Sha | H04W 48/12 |
| 2022/0104225 A1* | 3/2022 | Yan | H04W 72/1268 |
| 2022/0132445 A1* | 4/2022 | Kim | H04W 4/70 |
| 2022/0167438 A1* | 5/2022 | Shrestha | H04W 76/20 |
| 2022/0232659 A1* | 7/2022 | Kim | H04W 76/27 |
| 2022/0240341 A1* | 7/2022 | Kim | H04L 5/0064 |

OTHER PUBLICATIONS

Sierra Wireless: "LTE-M Preconfigured UL Resources Summary RAN1 #95", R1-183725, 3GPP TSG RAN WG1 Meeting #95, Spokane, USA, Nov. 12-16, 2018, Nov. 16, 2018 (Nov. 16, 2018) the Whole Document, 9 Pages.

* cited by examiner

RELEASE OF PRECONFIGURED UPLINK RESOURCE FOR SMALL DATA TRANSMISSION

CROSS-REFERENCE TO RELATED APPLICATIONS

This application claims the benefit of Application No. PCT/CN2020/105516, entitled "RELEASE OF PRECONFIGURED UPLINK RESOURCES FOR SMALL DATA TRANSMISSION," filed on Jul. 29, 2020, which is expressly incorporated by reference herein in its entirety.

BACKGROUND

Field

Aspects of the present disclosure relate generally to wireless communication systems, and more particularly, to preconfigured uplink resource (PUR) configuration and release operations. Certain embodiments of the technology discussed below can enable and provide enhanced PUR configuration and release operations.

Background

Wireless communication networks are widely deployed to provide various communication services such as voice, video, packet data, messaging, broadcast, and the like. These wireless networks may be multiple-access networks capable of supporting multiple users by sharing the available network resources. Such networks, which are usually multiple access networks, support communications for multiple users by sharing the available network resources. One example of such a network is the Universal Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). Examples of multiple-access network formats include Code Division Multiple Access (CDMA) networks, Time Division Multiple Access (TDMA) networks, Frequency Division Multiple Access (FDMA) networks, Orthogonal FDMA (OFDMA) networks, and Single-Carrier FDMA (SC-FDMA) networks.

A wireless communication network may include a number of base stations or node Bs that can support communication for a number of user equipments (UEs). A UE may communicate with a base station via downlink and uplink. The downlink (or forward link) refers to the communication link from the base station to the UE, and the uplink (or reverse link) refers to the communication link from the UE to the base station.

A base station may transmit data and control information on the downlink to a UE and/or may receive data and control information on the uplink from the UE. On the downlink, a transmission from the base station may encounter interference due to transmissions from neighbor base stations or from other wireless radio frequency (RF) transmitters. On the uplink, a transmission from the UE may encounter interference from uplink transmissions of other UEs communicating with the neighbor base stations or from other wireless RF transmitters. This interference may degrade performance on both the downlink and uplink.

As the demand for mobile broadband access continues to increase, the possibilities of interference and congested networks grows with more UEs accessing the long-range wireless communication networks and more short-range wireless systems being deployed in communities. Research and development continue to advance wireless technologies not only to meet the growing demand for mobile broadband access, but to advance and enhance the user experience with mobile communications.

SUMMARY

In one aspect of the disclosure, a method of wireless communication includes receiving, by a user equipment (UE), a preconfigured uplink resource (PUR) configuration message indicating a PUR configuration for small data transmissions; determining, by the UE, a PUR configuration release trigger for the PUR configuration; and receiving, by the UE, a PUR configuration release message configured to release the PUR configuration.

In an additional aspect of the disclosure, an apparatus configured for wireless communication is disclosed. The apparatus includes means for receiving, by a user equipment (UE), a preconfigured uplink resource (PUR) configuration message indicating a PUR configuration for small data transmissions; means for determining, by the UE, a PUR configuration release trigger for the PUR configuration; and means for receiving, by the UE, a PUR configuration release message configured to release the PUR configuration.

In an additional aspect of the disclosure, a non-transitory computer-readable medium having program code recorded thereon. The program code further includes code to receive, by a user equipment (UE), a preconfigured uplink resource (PUR) configuration message indicating a PUR configuration for small data transmissions; determine, by the UE, a PUR configuration release trigger for the PUR configuration; and receive, by the UE, a PUR configuration release message configured to release the PUR configuration.

In an additional aspect of the disclosure, an apparatus configured for wireless communication is disclosed. The apparatus includes at least one processor, and a memory coupled to the processor. The processor is configured to receive, by a user equipment (UE), a preconfigured uplink resource (PUR) configuration message indicating a PUR configuration for small data transmissions; determine, by the UE, a PUR configuration release trigger for the PUR configuration; and receive, by the UE, a PUR configuration release message configured to release the PUR configuration.

In another aspect of the disclosure, a method of wireless communication includes transmitting, by a network entity, a preconfigured uplink resource (PUR) configuration message indicating a PUR configuration for small data transmissions; determining, by the network entity, a PUR configuration release trigger for the PUR configuration; and transmitting, by the network entity, a PUR configuration release message configured to release the PUR configuration.

In an additional aspect of the disclosure, an apparatus configured for wireless communication is disclosed. The apparatus includes means for transmitting, by a network entity, a preconfigured uplink resource (PUR) configuration message indicating a PUR configuration for small data transmissions; means for determining, by the network entity, a PUR configuration release trigger for the PUR configuration; and means for transmitting, by the network entity, a PUR configuration release message configured to release the PUR configuration.

In an additional aspect of the disclosure, a non-transitory computer-readable medium having program code recorded thereon. The program code further includes code to transmit, by a network entity, a preconfigured uplink resource (PUR) configuration message indicating a PUR configuration for small data transmissions; determine, by the network entity, a PUR configuration release trigger for the PUR configuration; and transmit, by the network entity, a PUR configuration release message configured to release the PUR configuration.

In an additional aspect of the disclosure, an apparatus configured for wireless communication is disclosed. The apparatus includes at least one processor, and a memory coupled to the processor. The processor is configured to transmitting, by a network entity, a preconfigured uplink resource (PUR) configuration message indicating a PUR configuration for small data transmissions; determining, by the network entity, a PUR configuration release trigger for the PUR configuration; and transmitting, by the network entity, a PUR configuration release message configured to release the PUR configuration.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purpose of illustration and description, and not as a definition of the limits of the claims.

BRIEF DESCRIPTION OF THE DRAWINGS

A further understanding of the nature and advantages of the present disclosure may be realized by reference to the following drawings. In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

DETAILED DESCRIPTION

Figure 1:
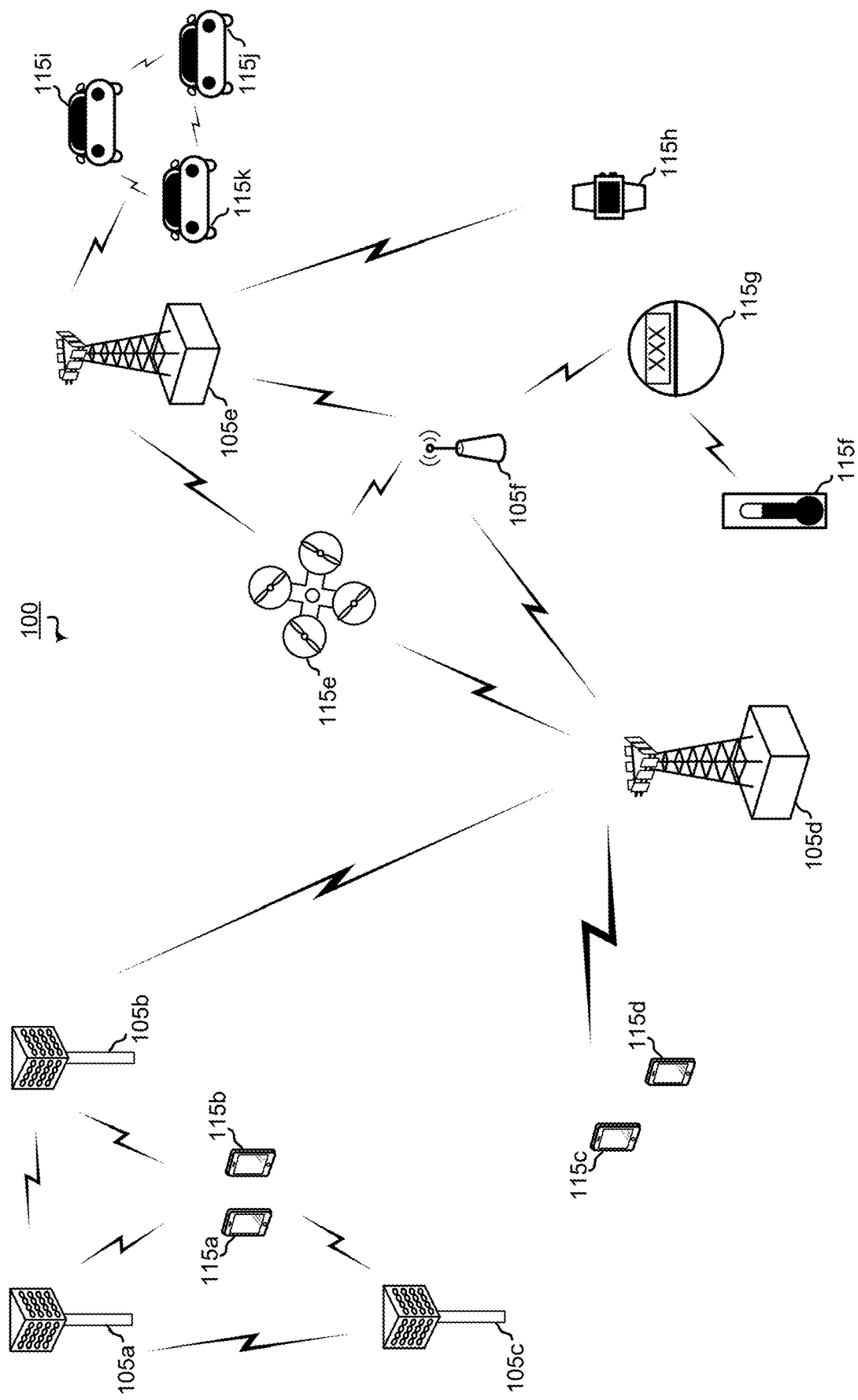
FIG. 1 is a block diagram illustrating details of a wireless communication system.

The detailed description set forth below, in connection with the appended drawings, is intended as a description of various configurations and is not intended to limit the scope of the disclosure. Rather, the detailed description includes specific details for the purpose of providing a thorough understanding of the inventive subject matter. It will be apparent to those skilled in the art that these specific details are not required in every case and that, in some instances, well-known structures and components are shown in block diagram form for clarity of presentation.

This disclosure relates generally to providing or participating in authorized shared access between two or more wireless communications systems, also referred to as wireless communications networks. In various embodiments, the techniques and apparatus may be used for wireless communication networks such as code division multiple access (CDMA) networks, time division multiple access (TDMA) networks, frequency division multiple access (FDMA) networks, orthogonal FDMA (OFDMA) networks, single-carrier FDMA (SC-FDMA) networks, LTE networks, GSM networks, $5^{th}$ Generation (5G) or new radio (NR) networks, as well as other communications networks. As described herein, the terms "networks" and "systems" may be used interchangeably.

An OFDMA network may implement a radio technology such as evolved UTRA (E-UTRA), IEEE 802.11, IEEE 802.16, IEEE 802.20, flash-OFDM and the like. UTRA, E-UTRA, and Global System for Mobile Communications (GSM) are part of universal mobile telecommunication system (UMTS). In particular, long term evolution (LTE) is a release of UMTS that uses E-UTRA. UTRA, E-UTRA, GSM, UMTS and LTE are described in documents provided from an organization named "3rd Generation Partnership Project" (3GPP), and cdma2000 is described in documents from an organization named "3rd Generation Partnership Project 2" (3GPP2). These various radio technologies and standards are known or are being developed. For example, the 3rd Generation Partnership Project (3GPP) is a collaboration between groups of telecommunications associations that aims to define a globally applicable third generation (3G) mobile phone specification. 3GPP long term evolution (LTE) is a 3GPP project which was aimed at improving the universal mobile telecommunications system (UMTS) mobile phone standard. The 3GPP may define specifications for the next generation of mobile networks, mobile systems, and mobile devices. The present disclosure is concerned with the evolution of wireless technologies from LTE, 4G, 5G, NR, and beyond with shared access to wireless spectrum between networks using a collection of new and different radio access technologies or radio air interfaces.

In particular, 5G networks contemplate diverse deployments, diverse spectrum, and diverse services and devices that may be implemented using an OFDM-based unified, air interface. In order to achieve these goals, further enhancements to LTE and LTE-A are considered in addition to development of the new radio technology for 5G NR networks. The 5G NR will be capable of scaling to provide coverage (1) to a massive Internet of things (IoTs) with an ultra-high density (e.g., ~1 M nodes/km$^2$), ultra-low complexity (e.g., ~10 s of bits/sec), ultra-low energy (e.g., ~10+ years of battery life), and deep coverage with the capability to reach challenging locations; (2) including mission-critical control with strong security to safeguard sensitive personal, financial, or classified information, ultra-high reliability (e.g., ~99.9999% reliability), ultra-low latency (e.g., ~1 ms), and users with wide ranges of mobility or lack thereof; and (3) with enhanced mobile broadband including extreme high capacity (e.g., ~10 Tbps/km$^2$), extreme data rates (e.g., multi-Gbps rate, 100+ Mbps user experienced rates), and deep awareness with advanced discovery and optimizations.

The 5G NR may be implemented to use optimized OFDM-based waveforms with scalable numerology and transmission time interval (TTI); having a common, flexible framework to efficiently multiplex services and features with a dynamic, low-latency time division duplex (TDD)/frequency division duplex (FDD) design; and with advanced wireless technologies, such as massive multiple input, multiple output (MIMO), robust millimeter wave (mmWave) transmissions, advanced channel coding, and device-centric mobility. Scalability of the numerology in 5G NR, with scaling of subcarrier spacing, may efficiently address operating diverse services across diverse spectrum and diverse deployments. For example, in various outdoor and macro coverage deployments of less than 3 GHz FDD/TDD implementations, subcarrier spacing may occur with 15 kHz, for example over 1, 5, 10, 20 MHz, and the like bandwidth. For other various outdoor and small cell coverage deployments of TDD greater than 3 GHz, subcarrier spacing may occur with 30 kHz over 80/100 MHz bandwidth. For other various indoor wideband implementations, using a TDD over the unlicensed portion of the 5 GHz band, the subcarrier spacing may occur with 60 kHz over a 160 MHz bandwidth. Finally, for various deployments transmitting with mmWave components at a TDD of 28 GHz, subcarrier spacing may occur with 120 kHz over a 500 MHz bandwidth.

The scalable numerology of the 5G NR facilitates scalable TTI for diverse latency and quality of service (QoS) requirements. For example, shorter TTI may be used for low latency and high reliability, while longer TTI may be used for higher spectral efficiency. The efficient multiplexing of long and short TTIs to allow transmissions to start on symbol boundaries. 5G NR also contemplates a self-contained integrated subframe design with uplink/downlink scheduling information, data, and acknowledgement in the same subframe. The self-contained integrated subframe supports communications in unlicensed or contention-based shared spectrum, adaptive uplink/downlink that may be flexibly configured on a per-cell basis to dynamically switch between uplink and downlink to meet the current traffic needs.

Various other aspects and features of the disclosure are further described below. It should be apparent that the teachings herein may be embodied in a wide variety of forms and that any specific structure, function, or both being disclosed herein is merely representative and not limiting. Based on the teachings herein one of an ordinary level of skill in the art should appreciate that an aspect disclosed herein may be implemented independently of any other aspects and that two or more of these aspects may be combined in various ways. For example, an apparatus may be implemented or a method may be practiced using any number of the aspects set forth herein. In addition, such an apparatus may be implemented or such a method may be practiced using other structure, functionality, or structure and functionality in addition to or other than one or more of the aspects set forth herein. For example, a method may be implemented as part of a system, device, apparatus, and/or as instructions stored on a computer readable medium for execution on a processor or computer. Furthermore, an aspect may comprise at least one element of a claim.

FIG. 1 is a block diagram illustrating 5G network 100 including various base stations and UEs configured according to aspects of the present disclosure. The 5G network 100 includes a number of base stations 105 and other network entities. A base station may be a station that communicates with the UEs and may also be referred to as an evolved node B (eNB), a next generation eNB (gNB), an access point, and the like. Each base station 105 may provide communication coverage for a particular geographic area. In 3GPP, the term "cell" can refer to this particular geographic coverage area of a base station and/or a base station subsystem serving the coverage area, depending on the context in which the term is used.

A base station may provide communication coverage for a macro cell or a small cell, such as a pico cell or a femto cell, and/or other types of cell. A macro cell generally covers a relatively large geographic area (e.g., several kilometers in radius) and may allow unrestricted access by UEs with service subscriptions with the network provider. A small cell, such as a pico cell, would generally cover a relatively smaller geographic area and may allow unrestricted access by UEs with service subscriptions with the network provider. A small cell, such as a femto cell, would also generally cover a relatively small geographic area (e.g., a home) and, in addition to unrestricted access, may also provide restricted access by UEs having an association with the femto cell (e.g., UEs in a closed subscriber group (CSG), UEs for users in the home, and the like). A base station for a macro cell may be referred to as a macro base station. A base station for a small cell may be referred to as a small cell base station, a pico base station, a femto base station or a home base station. In the example shown in FIG. 1, the base stations 105$d$ and 105$e$ are regular macro base stations, while base stations 105$a$-105$c$ are macro base stations enabled with one of 3 dimension (3D), full dimension (FD), or massive MIMO. Base stations 105$a$-105$c$ take advantage of their higher dimension MIMO capabilities to exploit 3D beamforming in both elevation and azimuth beamforming to increase coverage and capacity. Base station 105$f$ is a small cell base station which may be a home node or portable access point. A base station may support one or multiple (e.g., two, three, four, and the like) cells.

The 5G network 100 may support synchronous or asynchronous operation. For synchronous operation, the base stations may have similar frame timing, and transmissions from different base stations may be approximately aligned in time. For asynchronous operation, the base stations may have different frame timing, and transmissions from different base stations may not be aligned in time.

The UEs 115 are dispersed throughout the wireless network 100, and each UE may be stationary or mobile. A UE may also be referred to as a terminal, a mobile station, a subscriber unit, a station, or the like. A UE may be a cellular phone, a personal digital assistant (PDA), a wireless modem, a wireless communication device, a handheld device, a tablet computer, a laptop computer, a cordless phone, a wireless local loop (WLL) station, or the like. In one aspect, a UE may be a device that includes a Universal Integrated Circuit Card (UICC). In another aspect, a UE may be a device that does not include a UICC. In some aspects, UEs that do not include UICCs may also be referred to as internet of everything (IoE) or internet of things (IoT) devices. UEs 115a-115d are examples of mobile smart phone-type devices accessing 5G network 100 A UE may also be a machine specifically configured for connected communication, including machine type communication (MTC), enhanced MTC (eMTC), narrowband IoT (NB-IoT) and the like. UEs 115e-115k are examples of various machines configured for communication that access 5G network 100. A UE may be able to communicate with any type of the base stations, whether macro base station, small cell, or the like. In FIG. 1, a lightning bolt (e.g., communication links) indicates wireless transmissions between a UE and a serving base station, which is a base station designated to serve the UE on the downlink and/or uplink, or desired transmission between base stations, and backhaul transmissions between base stations.

In operation at 5G network 100, base stations 105a-105c serve UEs 115a and 115b using 3D beamforming and coordinated spatial techniques, such as coordinated multipoint (CoMP) or multi-connectivity. Macro base station 105d performs backhaul communications with base stations 105a-105c, as well as small cell, base station 105f. Macro base station 105d also transmits multicast services which are subscribed to and received by UEs 115c and 115d. Such multicast services may include mobile television or stream video, or may include other services for providing community information, such as weather emergencies or alerts, such as Amber alerts or gray alerts.

5G network 100 also support mission critical communications with ultra-reliable and redundant links for mission critical devices, such UE 115e, which is a drone. Redundant communication links with UE 115e include from macro base stations 105d and 105e, as well as small cell base station 105f. Other machine type devices, such as UE 115f (thermometer), UE 115g (smart meter), and UE 115h (wearable device) may communicate through 5G network 100 either directly with base stations, such as small cell base station 105f, and macro base station 105e, or in multi-hop configurations by communicating with another user device which relays its information to the network, such as UE 115f communicating temperature measurement information to the smart meter, UE 115g, which is then reported to the network through small cell base station 105f. 5G network 100 may also provide additional network efficiency through dynamic, low-latency TDD/FDD communications, such as in a vehicle-to-vehicle (V2V) mesh network between UEs 115i-115k communicating with macro base station 105e.

Figure 2:
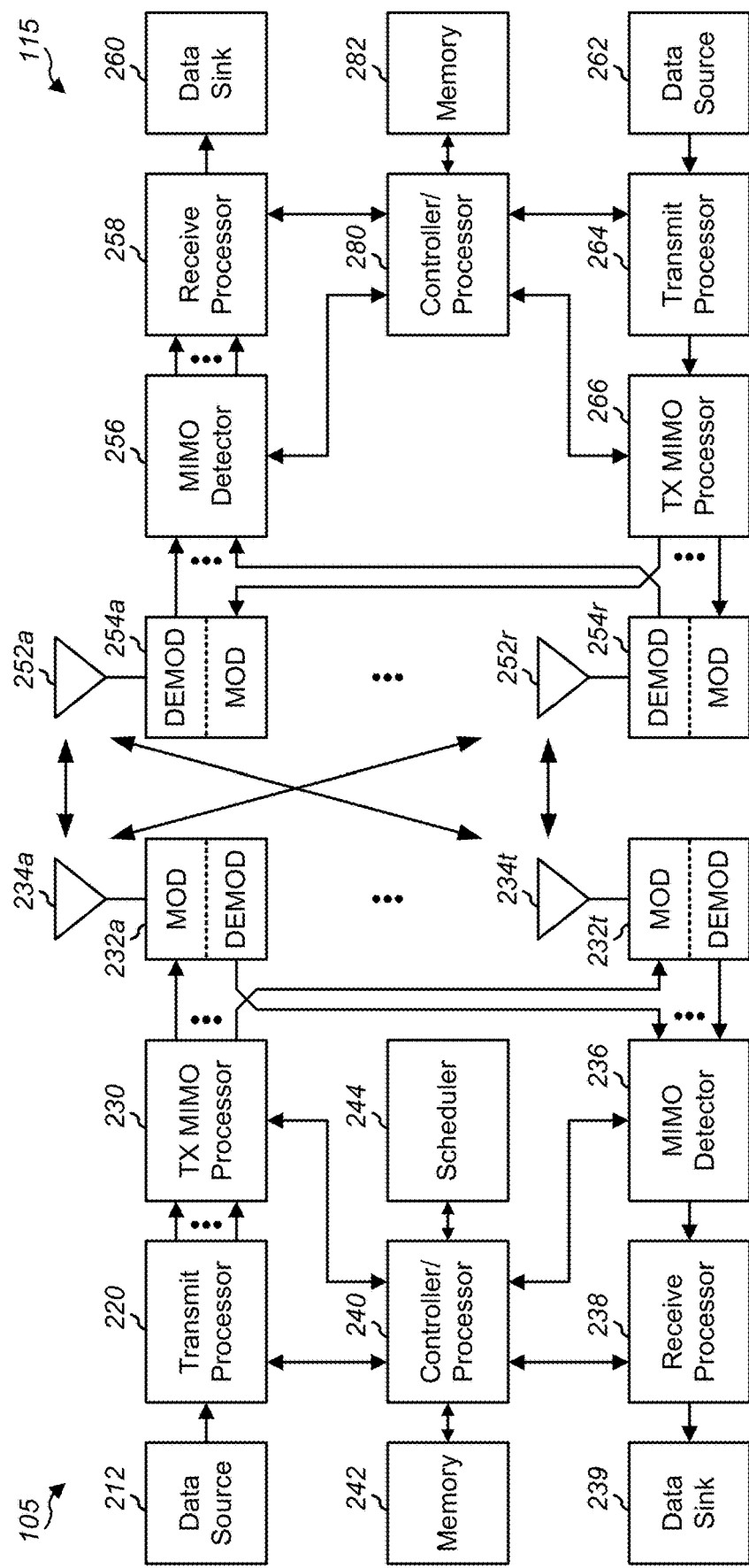
FIG. 2 is a block diagram illustrating a design of a base station and a UE configured according to one aspect of the present disclosure.

FIG. 2 shows a block diagram of a design of a base station 105 and a UE 115, which may be one of the base station and one of the UEs in FIG. 1. At the base station 105, a transmit processor 220 may receive data from a data source 212 and control information from a controller/processor 240. The control information may be for the PBCH, PCFICH, PHICH, PDCCH, EPDCCH, MPDCCH etc. The data may be for the PDSCH, etc. The transmit processor 220 may process (e.g., encode and symbol map) the data and control information to obtain data symbols and control symbols, respectively. The transmit processor 220 may also generate reference symbols, e.g., for the PSS, SSS, and cell-specific reference signal. A transmit (TX) multiple-input multiple-output (MIMO) processor 230 may perform spatial processing (e.g., precoding) on the data symbols, the control symbols, and/or the reference symbols, if applicable, and may provide output symbol streams to the modulators (MODs) 232a through 232t. Each modulator 232 may process a respective output symbol stream (e.g., for OFDM, etc.) to obtain an output sample stream. Each modulator 232 may further process (e.g., convert to analog, amplify, filter, and upconvert) the output sample stream to obtain a downlink signal. Downlink signals from modulators 232a through 232t may be transmitted via the antennas 234a through 234t, respectively.

At the UE 115, the antennas 252a through 252r may receive the downlink signals from the base station 105 and may provide received signals to the demodulators (DEMODs) 254a through 254r, respectively. Each demodulator 254 may condition (e.g., filter, amplify, downconvert, and digitize) a respective received signal to obtain input samples. Each demodulator 254 may further process the input samples (e.g., for OFDM, etc.) to obtain received symbols. A MIMO detector 256 may obtain received symbols from all the demodulators 254a through 254r, perform MIMO detection on the received symbols if applicable, and provide detected symbols. A receive processor 258 may process (e.g., demodulate, deinterleave, and decode) the detected symbols, provide decoded data for the UE 115 to a data sink 260, and provide decoded control information to a controller/processor 280.

On the uplink, at the UE 115, a transmit processor 264 may receive and process data (e.g., for the PUSCH) from a data source 262 and control information (e.g., for the PUCCH) from the controller/processor 280. The transmit processor 264 may also generate reference symbols for a reference signal. The symbols from the transmit processor 264 may be precoded by a TX MIMO processor 266 if applicable, further processed by the modulators 254a through 254r (e.g., for SC-FDM, etc.), and transmitted to the base station 105. At the base station 105, the uplink signals from the UE 115 may be received by the antennas 234, processed by the demodulators 232, detected by a MIMO detector 236 if applicable, and further processed by a receive processor 238 to obtain decoded data and control information sent by the UE 115. The processor 238 may provide the decoded data to a data sink 239 and the decoded control information to the controller/processor 240.

The controllers/processors 240 and 280 may direct the operation at the base station 105 and the UE 115, respectively. The controller/processor 240 and/or other processors and modules at the base station 105 may perform or direct the execution of various processes for the techniques described herein. The controllers/processor 280 and/or other processors and modules at the UE 115 may also perform or direct the execution of the functional blocks illustrated in FIGS. 7 and 8, and/or other processes for the techniques described herein. The memories 242 and 282 may store data and program codes for the base station 105 and the UE 115, respectively. A scheduler 244 may schedule UEs for data transmission on the downlink and/or uplink.

Wireless communications systems operated by different network operating entities (e.g., network operators) may share spectrum. In some instances, a network operating entity may be configured to use an entirety of a designated shared spectrum for at least a period of time before another network operating entity uses the entirety of the designated shared spectrum for a different period of time. Thus, in order to allow network operating entities use of the full designated shared spectrum, and in order to mitigate interfering communications between the different network operating entities, certain resources (e.g., time) may be partitioned and allocated to the different network operating entities for certain types of communication.

For example, a network operating entity may be allocated certain time resources reserved for exclusive communication by the network operating entity using the entirety of the shared spectrum. The network operating entity may also be allocated other time resources where the entity is given priority over other network operating entities to communicate using the shared spectrum. These time resources, prioritized for use by the network operating entity, may be utilized by other network operating entities on an opportunistic basis if the prioritized network operating entity does not utilize the resources. Additional time resources may be allocated for any network operator to use on an opportunistic basis.

Access to the shared spectrum and the arbitration of time resources among different network operating entities may be centrally controlled by a separate entity, autonomously determined by a predefined arbitration scheme, or dynamically determined based on interactions between wireless nodes of the network operators.

In some cases, UE 115 and base station 105 of the 5g network 100 (in FIG. 1) may operate in a shared radio frequency spectrum band, which may include licensed or unlicensed (e.g., contention-based) frequency spectrum. In an unlicensed frequency portion of the shared radio frequency spectrum band, UEs 115 or base stations 105 may traditionally perform a medium-sensing procedure to contend for access to the frequency spectrum. For example, UE 115 or base station 105 may perform a listen before talk (LBT) procedure such as a clear channel assessment (CCA) prior to communicating in order to determine whether the shared channel is available. A CCA may include an energy detection procedure to determine whether there are any other active transmissions. For example, a device may infer that a change in a received signal strength indicator (RSSI) of a power meter indicates that a channel is occupied. Specifically, signal power that is concentrated in a certain bandwidth and exceeds a predetermined noise floor may indicate another wireless transmitter. A CCA also may include detection of specific sequences that indicate use of the channel. For example, another device may transmit a specific preamble prior to transmitting a data sequence. In some cases, an LBT procedure may include a wireless node adjusting its own backoff window based on the amount of energy detected on a channel and/or the acknowledge/negative-acknowledge (ACK/NACK) feedback for its own transmitted packets as a proxy for collisions.

In general, four categories of LBT procedure have been suggested for sensing a shared channel for signals that may indicate the channel is already occupied. In a first category (CAT 1 LBT), no LBT or CCA is applied to detect occupancy of the shared channel. A second category (CAT 2 LBT), which may also be referred to as an abbreviated LBT, a single-shot LBT, or a 25-μs LBT, provides for the node to perform a CCA to detect energy above a predetermined threshold or detect a message or preamble occupying the shared channel. The CAT 2 LBT performs the CCA without using a random back-off operation, which results in its abbreviated length, relative to the next categories.

A third category (CAT 3 LBT) performs CCA to detect energy or messages on a shared channel, but also uses a random back-off and fixed contention window. Therefore, when the node initiates the CAT 3 LBT, it performs a first CCA to detect occupancy of the shared channel. If the shared channel is idle for the duration of the first CCA, the node may proceed to transmit. However, if the first CCA detects a signal occupying the shared channel, the node selects a random back-off based on the fixed contention window size and performs an extended CCA. If the shared channel is detected to be idle during the extended CCA and the random number has been decremented to 0, then the node may begin transmission on the shared channel. Otherwise, the node decrements the random number and performs another extended CCA. The node would continue performing extended CCA until the random number reaches 0. If the random number reaches 0 without any of the extended CCAs detecting channel occupancy, the node may then transmit on the shared channel. If at any of the extended CCA, the node detects channel occupancy, the node may re-select a new random back-off based on the fixed contention window size to begin the countdown again.

A fourth category (CAT 4 LBT), which may also be referred to as a full LBT procedure, performs the CCA with energy or message detection using a random back-off and variable contention window size. The sequence of CCA detection proceeds similarly to the process of the CAT 3 LBT, except that the contention window size is variable for the CAT 4 LBT procedure.

Use of a medium-sensing procedure to contend for access to an unlicensed shared spectrum may result in communication inefficiencies. This may be particularly evident when multiple network operating entities (e.g., network operators) are attempting to access a shared resource. In the 5G network 100, base stations 105 and UEs 115 may be operated by the same or different network operating entities. In some examples, an individual base station 105 or UE 115 may be operated by more than one network operating entity. In other examples, each base station 105 and UE 115 may be operated by a single network operating entity. Requiring each base station 105 and UE 115 of different network operating entities to contend for shared resources may result in increased signaling overhead and communication latency.

Figure 3A:
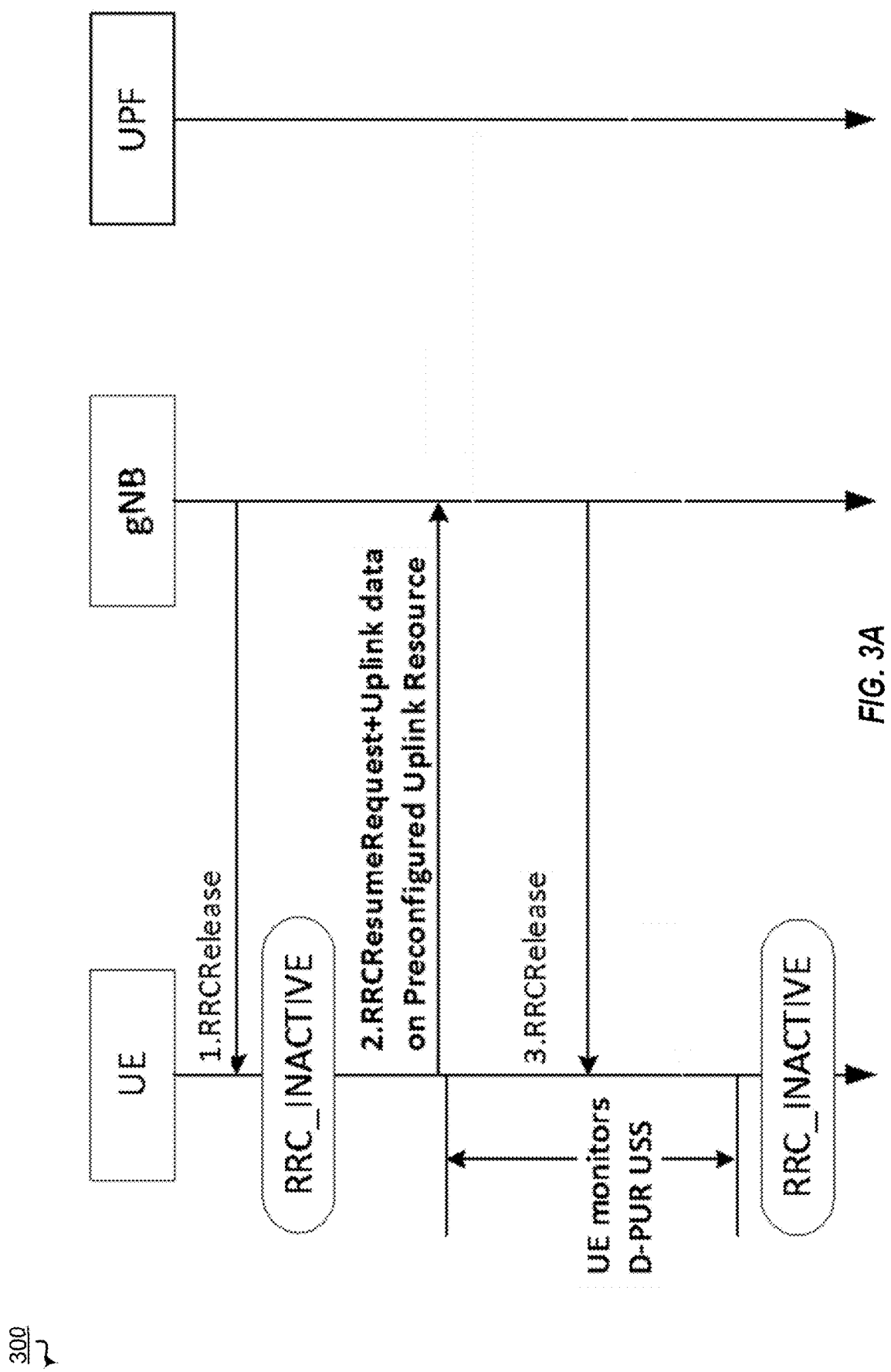
FIG. 3A is a diagram of a first example of PUR operations.
Figure 3B:
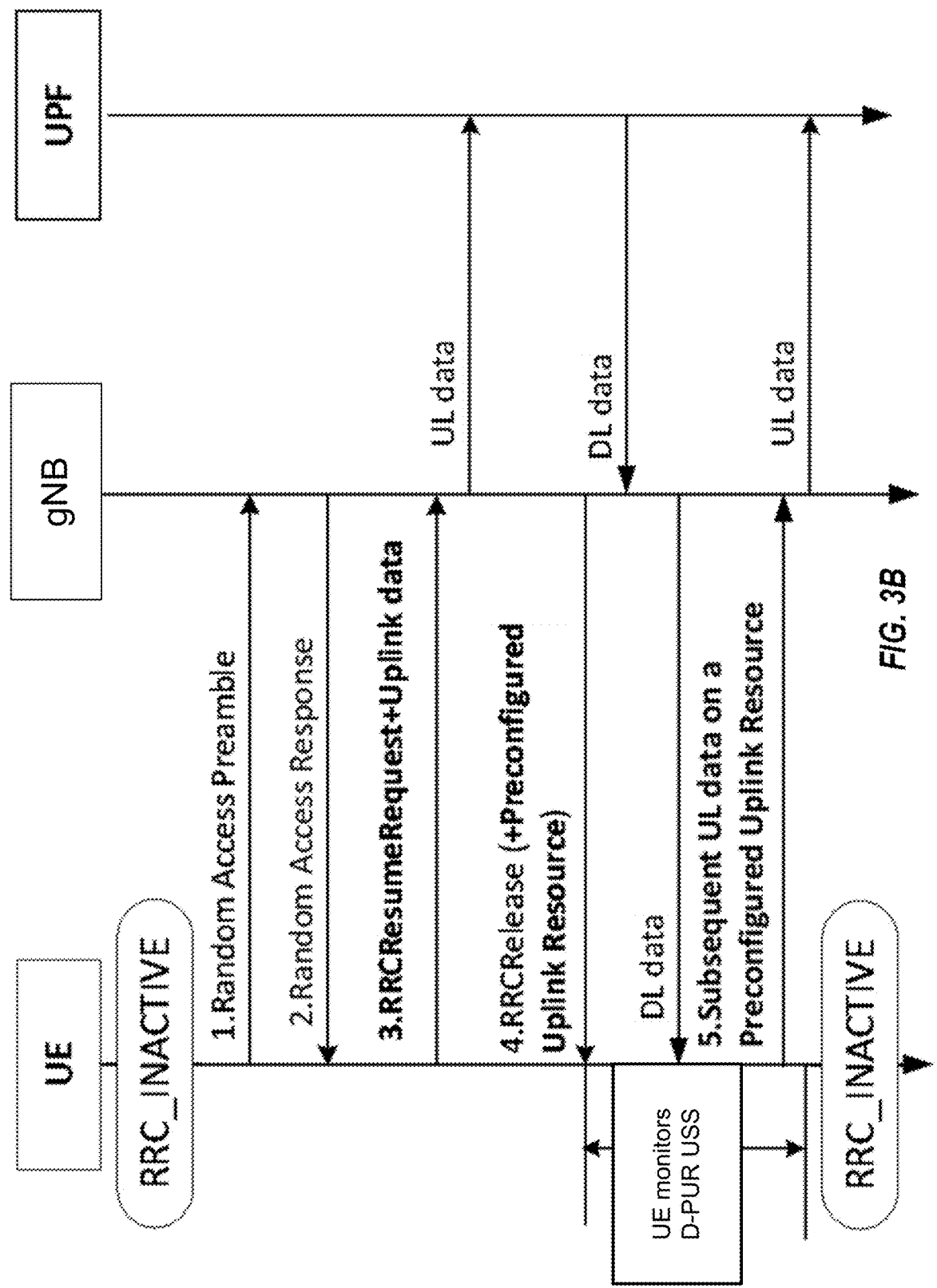
FIG. 3B is a diagram of a second example of PUR operations.
Figure 3C:
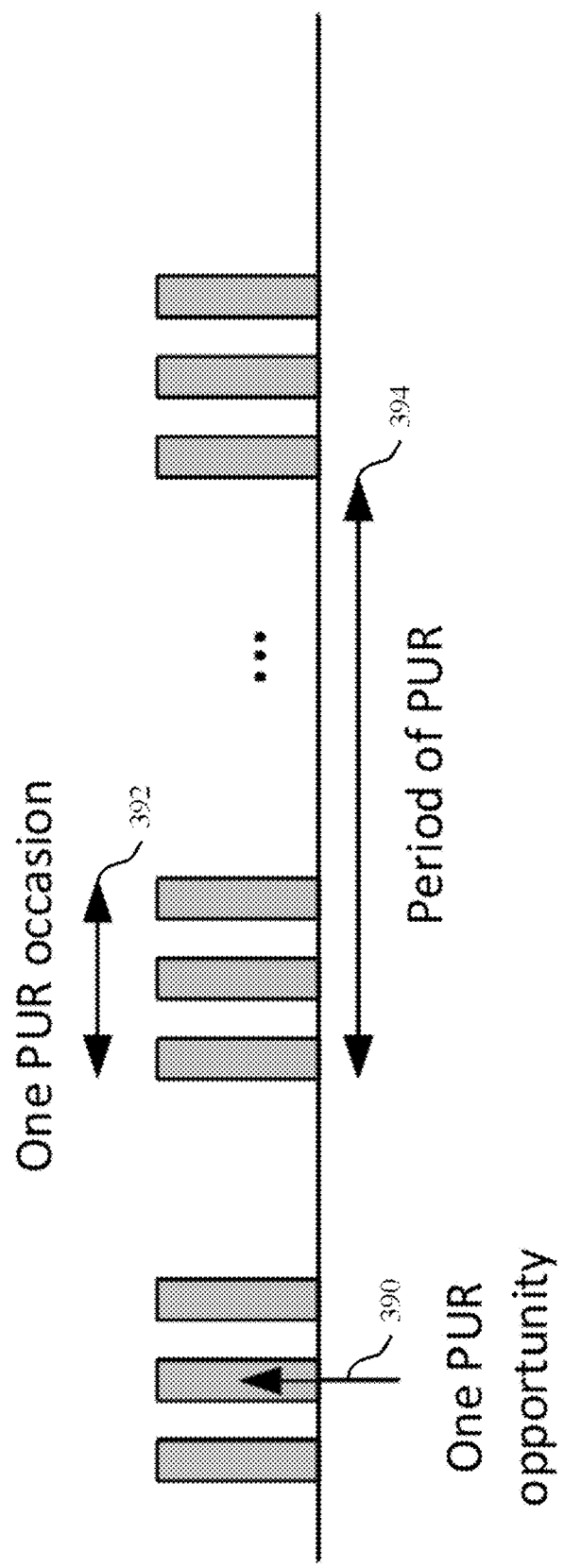
FIG. 3C is a diagram that illustrates resources and settings of a particular PUR configuration.

FIGS. 3A, 3B, and 3C illustrate examples of PUR: Preconfigured Uplink Resource or Preconfigured PUSCH Resource configuration and use operations. In FIGS. 3A and 3B, PUR configuration and use operations are shown, and in FIG. 3C an example diagram illustrating PUR configuration settings is shown.

A UE often generates only a small amount of data across a burst in a data session. This type of data traffic can occur in or across all verticals including mobile broadband (MBB) and IoT. Example of such small data bursts include data bursts for instant messing software, social media software, wearable IoT devices, and etc. It is beneficial for a network to allow a UE to transmit mobile originating (MO) uplink small data in an RRC_INACTIVE state without the UE having to move to an RRC_CONNECTED state.

For example, the network may enable transmission of uplink data on preconfigured PUSCH resources from the RRC_INACTIVE state under certain conditions, such as when timing advance (TA) value is valid. To illustrate, a TA timer may be used to track a validity of the TA value which may indicate that the uplink timing settings are valid.

The network (e.g., eNB or gNB) configures dedicated preconfigured uplink resources for the UE (or a data radio bearer (DRB) thereof) via RRC dedicated signaling. Such signaling can occur when the UE is in a RRC_CON-NECTED (e.g., in FIG. 3A) or in RRC_INACTIVE mode (e.g., in FIG. 3B).

In the RRC_INACTIVE state, if the UE has small data to send and it has valid settings, such as value uplink timing settings, it can request a small data transfer or transfers without transitioning to the RRC Connected state.

The UE may then transmit the small data (i.e., small data transmission) via the PUR configuration. After the UE's transmission over the configured PUR, it monitors the PUR search space for the network's response.

For NR UL small data transmission, preconfigured uplink resource can be configured to UE for subsequent uplink data transmission when the first uplink small data is transmitted via 2-step/4-step Random Access Channel (RACH) procedure. The UE receives the preconfigured uplink resource configuration and transmits subsequent UL packet in the preconfigured resource without entering RRC_CON-NECTED mode. This has the benefit of power saving to keep UE in RRC_INACTIVE state for subsequent data transmission without entering RRC_CONNECTED.

Referring to FIG. 3A, a ladder diagram for a UE, base station, and a user plane function (UPF) is illustrated. Prior to step 1, the UE is in an RRC connected state. At step 1, the base station (e.g., gNB) transmits a RRC release message. The RRC release message includes or corresponds to a RRC message and may optionally include release clause information (e.g., releaseClause), next hop parameter (NH) chaining counter (NCC) information, and a PUR configuration information (e.g. Preconfigured PUSCH resource information). The RRC release message may be generated responsive to the base station determining to transition the UE to a RRC inactive state.

Responsive to receiving the RRC release message, the UE transitions from the RRC connected state to the RRC inactive state, as shown prior to step 2. At step 2, the UE transmits a RRC resume request message. The RRC resume request message includes or corresponds to a RRC message and may optionally be sent with uplink data, such as a small data transmission which is sent according to the PUR configuration of the RRC release message.

At step 3, the base station (e.g., gNB) transmits a second RRC release message. The second RRC release message includes or corresponds to a RRC message and may optionally include release clause information (e.g., releaseClause), resume information (e.g., resumeID), next hop parameter (NH) chaining counter (NCC) information. As compared to the RRC release message of step 1 (e.g., first RRC release message), the second RRC release message may include resume information and may not include PUR configuration information, as such PUR configuration information was previously sent at step 1.

Between steps 2 and 3, the base station may transmit the received uplink data from the UE to the UPF. After step 3, the UPF may transmit downlink data to the base station (e.g., gNB); the base station may transmit downlink to the UE. As shown in FIG. 3A, the UE monitors the search space (e.g., USS) of the PUR configuration after using a particular PUR resource (e.g., transmitting the uplink data at step 2).

Referring to FIG. 3B, a ladder diagram for a UE, base station, and a user plane function (UPF) is illustrated. Prior to step 1, the UE is in an RRC inactive state. At step 1, the UE transmits a random access preamble message, RACH preamble message (e.g., Message1). The RACH preamble message may include or correspond to a RRC message.

At step 2, the base station (e.g., gNB) transmits a random access response message, RACH response message (e.g., Message2). The RACH response message may include or correspond to a RRC message.

At step 3, the UE transmits a RRC resume request message (e.g., Message3). The RRC resume request message includes or corresponds to a RRC message and may optionally be sent with uplink data, such as a small data transmission.

At step 4, the base station (e.g., gNB) transmits a RRC release message (e.g., Message4). The RRC release message includes or corresponds to a RRC message and may optionally include release clause information (releaseClause), resume information (e.g., resumeID), next hop parameter (NH) chaining counter (NCC) information, and a PUR configuration information (e.g. Preconfigured PUSCH resource).

At step 5, the UE may optionally transmit subsequent uplink data, small data transmissions, using the PUR configuration and resources thereof. Between steps 3 and 4, the base station may transmit the uplink data from the UE to the UPF. Between steps 4 and 5, the UPF may transmit downlink data to the base station (e.g., gNB); the base station may transmit downlink to the UE. After step 5, the base station may transmit the subsequent uplink data from the UE to the UPF.

As shown in FIG. 3B, the UE monitors the search space (e.g., USS) of the PUR configuration after receiving the particular PUR configuration (e.g., receiving the RRC release message with the PUR configuration information at step 4).

Referring to FIG. 3C, a diagram of transmit opportunities for a particular PUR configuration are illustrated. In FIG. 3, three PUR transmit occasions (aka PUR occasions) are illustrated. A PUR occasion may include one or more PUR transmit opportunities. In the example of FIG. 3C, each PUR occasion includes three PUR transmit opportunities (aka PUR opportunity). Additionally, each occasion and opportunity may occur or have a particular timing, such as periodicity. A PUR periodicity is shown in FIG. 3A between the second and third PUR occasions. The PUR periodicity in FIG. 3C is a PUR occasion periodicity and it indicates a duration in time from a start of one PUR occasion (i.e., a start of a first or only PUR opportunity of the PUR occasion) to a start of another, consecutive PUR occasion (i.e., a start of a first or only PUR opportunity of the PUR occasion).

In some implementations where occasions include multiple opportunities, the UE or network may decide on which opportunity to use. In the example of FIG. 3C, the UE determines to use a first transmit opportunity of each occasion based on Synchronization Signal Block (SSB) conditions. To illustrate, each transmit opportunity may be associated with a particular SSB, thus the UE may determine which opportunity to use based on determining which SSB to use. The UE may keep such opportunity for each occasion or may change the opportunity, such as when the UE decides to switch/use another SSB.

As an illustrative example, the UE 115 may measure a reference signal received power (RSRP) of candidate SSBs. The UE 115 determines and selects a SSB among the candidate SSBs whose RSRP is above a threshold, such as Trsrp. The UE 115 then may transmit data over the first available PUR opportunity associated with the selected SSB.

The UE 115 then monitors the network's response after it transmits data over the PUR opportunity. For example, the UE monitors a PDCCH a configured search space over monitoring occasions that are quasi co-located (QCL) with its selected SSB. The UE then may start a timer when the monitoring starts.

If the UE does not receive any message, such as a DCI, from network upon expiry of the timer, the UE switches to a RACH based small data transmissions. Otherwise, UE follows the normal dynamic grant/assignment procedure per NW's scheduling.

Figure 4:
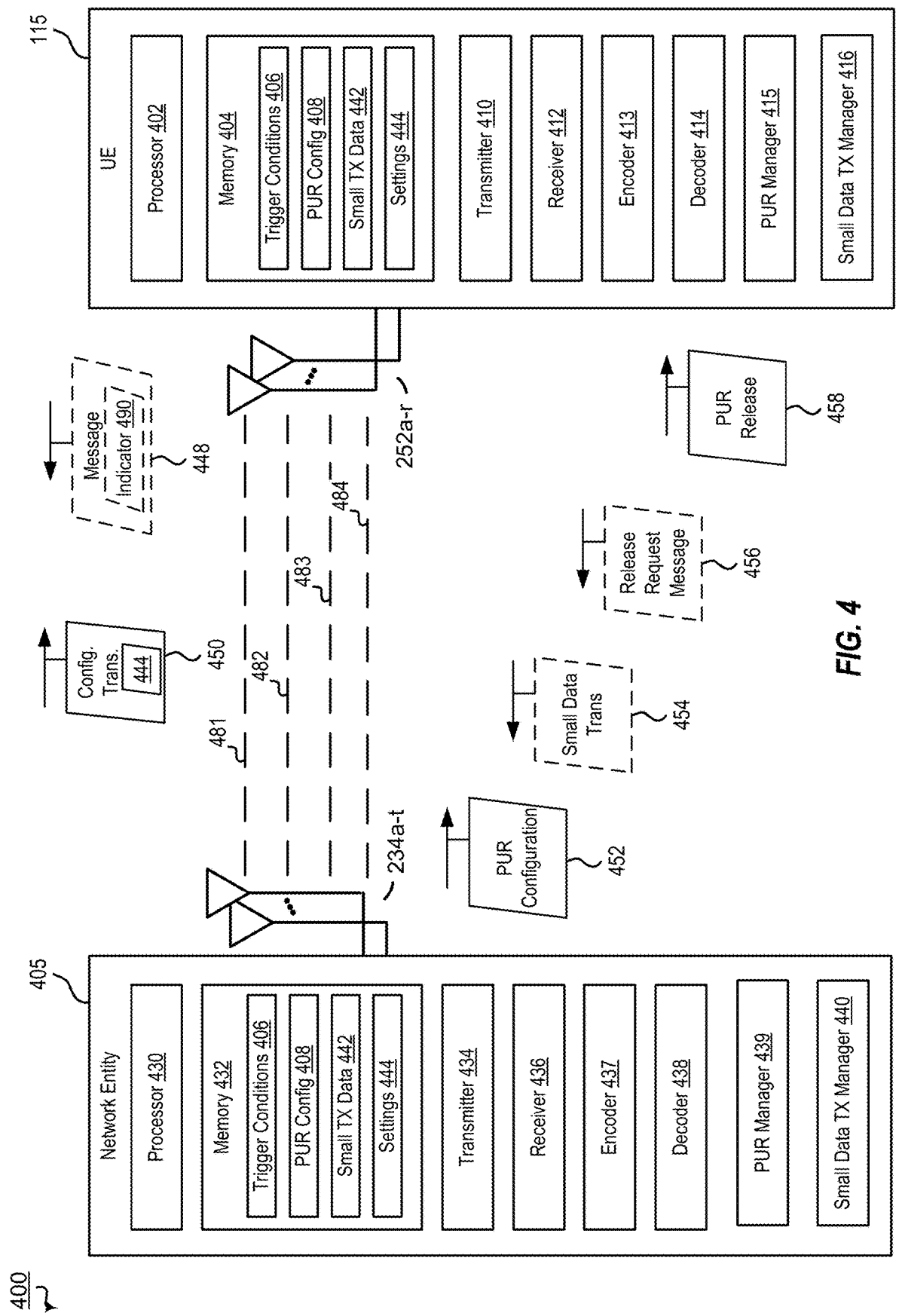
FIG. 4 is a block diagram illustrating an example of a wireless communications system (with a UE and base station) with PUR configuration and release operations.

FIG. 4 illustrates an example of a wireless communications system 400 that supports PUR configuration and release operations in accordance with aspects of the present disclosure. In some examples, wireless communications system 400 may implement aspects of wireless communication system 100. For example, wireless communications system 400 may include UE 115 and network entity 405. PUR configuration and release operations may reduce power consumption and network switching by enabling a UE to send data from an RRC inactive state. Thus, network and device performance can be increased.

Network entity 405 and UE 115 UE 115 may be configured to communicate via frequency bands, such as FR1 having a frequency of 410 to 7125 MHz, FR2 having a frequency of 24250 to 52600 MHz for mm-Wave, and/or one or more other frequency bands. It is noted that SCS may be equal to 15, 30, 60, or 120 kHz for some data channels. Network entity 405 and UE 115 may be configured to communicate via one or more component carriers (CCs), such as representative first CC 481, second CC 482, third CC 483, and fourth CC 484. Although four CCs are shown, this is for illustration only, more or fewer than four CCs may be used. One or more CCs may be used to communicate control channel transmissions, data channel transmissions, and/or sidelink channel transmissions.

Such transmissions may include a Physical Downlink Control Channel (PDCCH), a Physical Downlink Shared Channel (PDSCH), a Physical Uplink Control Channel (PUCCH), a Physical Uplink Shared Channel (PUSCH), a Physical Sidelink Control Channel (PSCCH), a Physical Sidelink Shared Channel (PSSCH), or a Physical Sidelink Feedback Channel (PSFCH). Such transmissions may be scheduled by aperiodic grants and/or periodic grants.

Each periodic grant may have a corresponding configuration, such as configuration parameters/settings. The periodic grant configuration may include configured grant (CG) configurations and settings. Additionally, or alternatively, one or more periodic grants (e.g., CGs thereof) may have or be assigned to a CC ID, such as intended CC ID.

Each CC may have a corresponding configuration, such as configuration parameters/settings. The configuration may include bandwidth, bandwidth part, HARQ process, TCI state, RS, control channel resources, data channel resources, or a combination thereof. Additionally, or alternatively, one or more CCs may have or be assigned to a Cell ID, a Bandwidth Part (BWP) ID, or both. The Cell ID may include a unique cell ID for the CC, a virtual Cell ID, or a particular Cell ID of a particular CC of the plurality of CCs. Additionally, or alternatively, one or more CCs may have or be assigned to a HARQ ID. Each CC may also have corresponding management functionalities, such as, beam management, BWP switching functionality, or both. In some implementations, two or more CCs are quasi co-located, such that the CCs have the same beam and/or same symbol.

In some implementations, control information may be communicated via network entity 405 and UE 115. For example, the control information may be communicated suing MAC-CE transmissions, RRC transmissions, DCI, transmissions, another transmission, or a combination thereof.

UE 115 can include a variety of components (e.g., structural, hardware components) used for carrying out one or more functions described herein. For example, these components can includes processor 402, memory 404, transmitter 410, receiver 412, encoder, 413, decoder 414, PUR manager 415, small data transmission manager 416, and antennas 252a-r. Processor 402 may be configured to execute instructions stored at memory 404 to perform the operations described herein. In some implementations, processor 402 includes or corresponds to controller/processor 280, and memory 404 includes or corresponds to memory 282. Memory 404 may also be configured to store trigger condition data 406, PUR configuration data 408, small transmission data 442, settings data 444, or a combination thereof, as further described herein.

The trigger condition data 406 includes or corresponds to data associated with or corresponding to PUR configuration release trigger condition information. For example, the trigger condition data 406 may indicate one or more possible trigger conditions and/or an active trigger condition or conditions. The trigger condition data 406 may also include thresholds or data used to evaluate the trigger conditions, such as conditions for evaluating inactivity timers. Additionally, the trigger condition data 406 may also include thresholds or data used to evaluate trigger transmission conditions, such as a DCI indicator value of 1 corresponds to releasing the PUR configuration.

The PUR configuration data 408 includes or corresponds to data indicating or corresponding to PUR configurations for small data transmissions. For example, the PUR configuration data 408 may include possible PUR configurations, an active (e.g., currently used) PUR configuration, a default PUR configuration, a requested PUR configuration, a received PUR configuration, or a combination thereof. The PUR configuration data 408 may indicate a number of transmit occasions, a number of transmit opportunities per occasion, a periodicity of the occasions, the opportunities, or both. The indicated PUR configurations may be per UE or per data radio bearer (DRB). In some implementations, the PUR configuration data 408 may further indicate PUSCH configurations or settings.

The small transmission data 442 includes or corresponds to data that is associated with small data transmissions. The small transmission data 442 may include short and/or small bursts of data for MBB and IoT applications, such as data for instant messaging application, social media applications, wearable devices (e.g., fitness trackers and monitors), etc. The small transmission data 442 may include data with less than a threshold number of bytes, such as less than 10 bytes or less than 1000 bytes.

The settings data 444 includes or corresponds to data associated with PUR configuration and release operations. The settings data 444 may include one or more types of PUR configuration and release operation modes and/or thresholds or conditions for switching between PUR configuration and release modes and/or configurations. For example, the settings data 444 may have data indicating different thresholds for different PUR release modes, such as UE initiated PUR configuration release modes and network initiated PUR configuration release.

Transmitter 410 is configured to transmit data to one or more other devices, and receiver 412 is configured to receive data from one or more other devices. For example, transmitter 410 may transmit data, and receiver 412 may receive data, via a network, such as a wired network, a wireless network, or a combination thereof. For example, UE 115 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 410 and receiver 412 may be replaced with a transceiver. Additionally, or alternatively, transmitter 410, receiver, 412, or both may include or correspond to one or more components of UE 115 described with reference to FIG. 2.

Encoder 413 and decoder 414 may be configured to encode and decode data for transmission. PUR manager 415 may be configured to determine and perform PUR management operations, such as configuration and release operations. For example, PUR manager 415 is configured to determine and implement a received PUR configuration. As another example, PUR manager 415 is configured to determine a particular PUR configuration release trigger and release the particular PUR configuration responsive to particular PUR configuration release trigger. Optionally, in such implementations, the PUR manager 415 may transmit a PUR configuration release request message to the network. Additionally, in some implementations, PUR manager 415 may be further configured to request a particular PUR configuration prior to receipt of a PUR configuration from the network.

Small data transmission manager 416 may be configured to determine and perform small data transmission management operations. For example, small data transmission manager 416 may be configured to determine data for small data transmissions and to generate small data transmissions.

Network entity 405 includes processor 430, memory 432, transmitter 434, receiver 436, encoder 437, decoder 438, PUR manager 439, small data transmission manager 440, and antennas 234a-t. Processor 430 may be configured to execute instructions stores at memory 432 to perform the operations described herein. In some implementations, processor 430 includes or corresponds to controller/processor 240, and memory 432 includes or corresponds to memory 242. Memory 432 may be configured to store trigger condition data 406, PUR configuration data 408, small transmission data 442, settings data 444, or a combination thereof, similar to the UE 115 and as further described herein.

Transmitter 434 is configured to transmit data to one or more other devices, and receiver 436 is configured to receive data from one or more other devices. For example, transmitter 434 may transmit data, and receiver 436 may receive data, via a network, such as a wired network, a wireless network, or a combination thereof. For example, network entity 405 may be configured to transmit and/or receive data via a direct device-to-device connection, a local area network (LAN), a wide area network (WAN), a modem-to-modem connection, the Internet, intranet, extranet, cable transmission system, cellular communication network, any combination of the above, or any other communications network now known or later developed within which permits two or more electronic devices to communicate. In some implementations, transmitter 434 and receiver 436 may be replaced with a transceiver. Additionally, or alternatively, transmitter 434, receiver, 436, or both may include or correspond to one or more components of network entity 405 described with reference to FIG. 2.

Encoder 437, and decoder 438 may include the same functionality as described with reference to encoder 413 and decoder 414, respectively. PUR manager 439 may include similar functionality as described with reference to PUR manager 415. Small data transmission manager 440 may include similar functionality as described with reference to small data transmission manager 416.

During operation of wireless communications system 400, network entity 405 may determine that UE 115 has PUR configuration and release capability. For example, UE 115 may transmit a message 448 that includes a PUR configuration and/or release indicator 490 (e.g., a PUR configuration and release indicator). Indicator 490 may indicate PUR configuration and release operation capability or a particular type or mode of PUR configuration and release operation. In some implementations, network entity 405 sends control information to indicate to UE 115 that PUR configuration and release operation and/or a particular type of PUR configuration and release operation is to be used. For example, in some implementations, message 448 (or another message, such as configuration transmission 450) is transmitted by the network entity 405. The configuration transmission 450 may include or indicate to use PUR configuration and release operations or to adjust or implement a setting of a particular type of PUR configuration and release operation.

During operation, devices of wireless communications system 400, perform PUR configuration and release operations. For example, the network entity 405 and the UE 115 exchange transmissions to set a particular PUR configuration. Such transmissions may include or correspond to RRC transmission illustrated in FIGS. 3A and 3B. In the example of FIG. 4, the network entity 405 transmits a PUR configuration message 452 to the UE 115. The PUR configuration message 452 may include or indicate a particular PUR configuration or multiple PUR configurations (e.g., PUR configuration data 408). To illustrate, the network entity 405 may send an RRC message, such as a RRC Release message, indicating a PUR configuration. As another illustration, the network entity 405 may send an RRC message which includes multiple PUR configurations, such as multiple per DRB PUR configurations for a single UE.

The indicated PUR configuration may include a number of transmit occasions, a number of transmit opportunities per transmit occasion, a periodicity of the transmit occasions and/or opportunities, or a combination thereof. The PUR configuration may also indicate one or more release conditions (e.g., trigger release data 406) which may be active or application. Satisfaction of one or more of such release conditions will cause the UE and/or network to initiate release of the PUR configuration. The PUR configuration may further indicate if the PUR configuration is for the UE 115, or for a DRB of or associated with the UE 115. By using per DRB PUR configurations, the UE 115 may be configured with multiple PUR configurations with different settings.

The network entity 405 and/or the UE 115 may optionally perform one or more small data transmissions 454 using the PUR configuration included in or indicated by the PUR configuration message 452. For example, the UE 115 may transmit multiple small data transmissions The network entity 405 and/or the UE 115 may determine to release the PUR configuration to more efficiently use the network spectrum (e.g., not waste unused spectrum which is dedicated to the UE 115 alone).

For example, the UE 115 may determine a PUR configuration release condition is satisfied and may transmit a release request message 456 to the network entity 405 to indicate to the network entity 405 to release the PUR configuration. To illustrate, the UE 115 may send a RRC or MAC CE transmission to indicate and/or request a PUR configuration release.

As another example, both the network entity 405 and the UE 115 may determine a PUR configuration release condition is satisfied. In such cases, no signaling may be needed (e.g., release request message 456 is not needed or sent) because both of the network entity 405 and the UE 115 each monitor the condition and release the PUR configuration upon the particular PUR configuration release condition being satisfied.

Alternatively, the network entity 405 may determine a PUR configuration release condition is satisfied and may transmit a release message 458 to the UE 115 to indicate to the UE to release the PUR configuration. In addition, the network entity 405 may transmit the release message 458 to the UE 115 responsive to receiving the release request message 456 to confirm to the UE 115 to release the PUR configuration. Examples of such PUR configuration release conditions include UE based triggers, network based triggers, or both. Some examples of UE based triggers include a TA timer, a number of PUR transmit opportunity condition, a UE based trigger signal, a RACH procedure condition, or a LBT failure condition. Some examples of UE network triggers include a network configured timer, a network configured counter, or a network sent trigger signal.

During the above operations, the UE 115 may remain in a RRC inactive mode. In other implementations, the UE 115 may determine to switch a RRC connected mode to perform data transmissions, such as when no PUR configuration is received, no PUR configuration is active, or the UE 115 has larger amounts of data to send.

In some such implementations, the UE 115 may perform RACH operations to send data. For example, if the UE 115 does not receive a dynamic grant (establishing a PUR configuration) the UE 115 may perform RACH operations and send data during one or more of the RACH messages. To illustrate, in a two-step RACH procedure the UE 115 may send data (e.g., small data) during or with MessageA or may send data (e.g., small data) during or with Message3 for a four-step RACH procedure.

Accordingly, the UE 115 and network entity 405 may be able to more efficiently configure and release PUR configurations. Thus, FIG. 4 describes enhanced PUR configuration and release operations. Using enhanced PUR configuration and release operations may enable improvements when operating with less advanced hardware, such as power conservation. Performing enhanced PUR configuration and release operations enables reduced bandwidth/spectrum waste when performing small data transmissions and thus, enhanced UE and network performance by increasing throughput and reducing latency.

Figure 5:
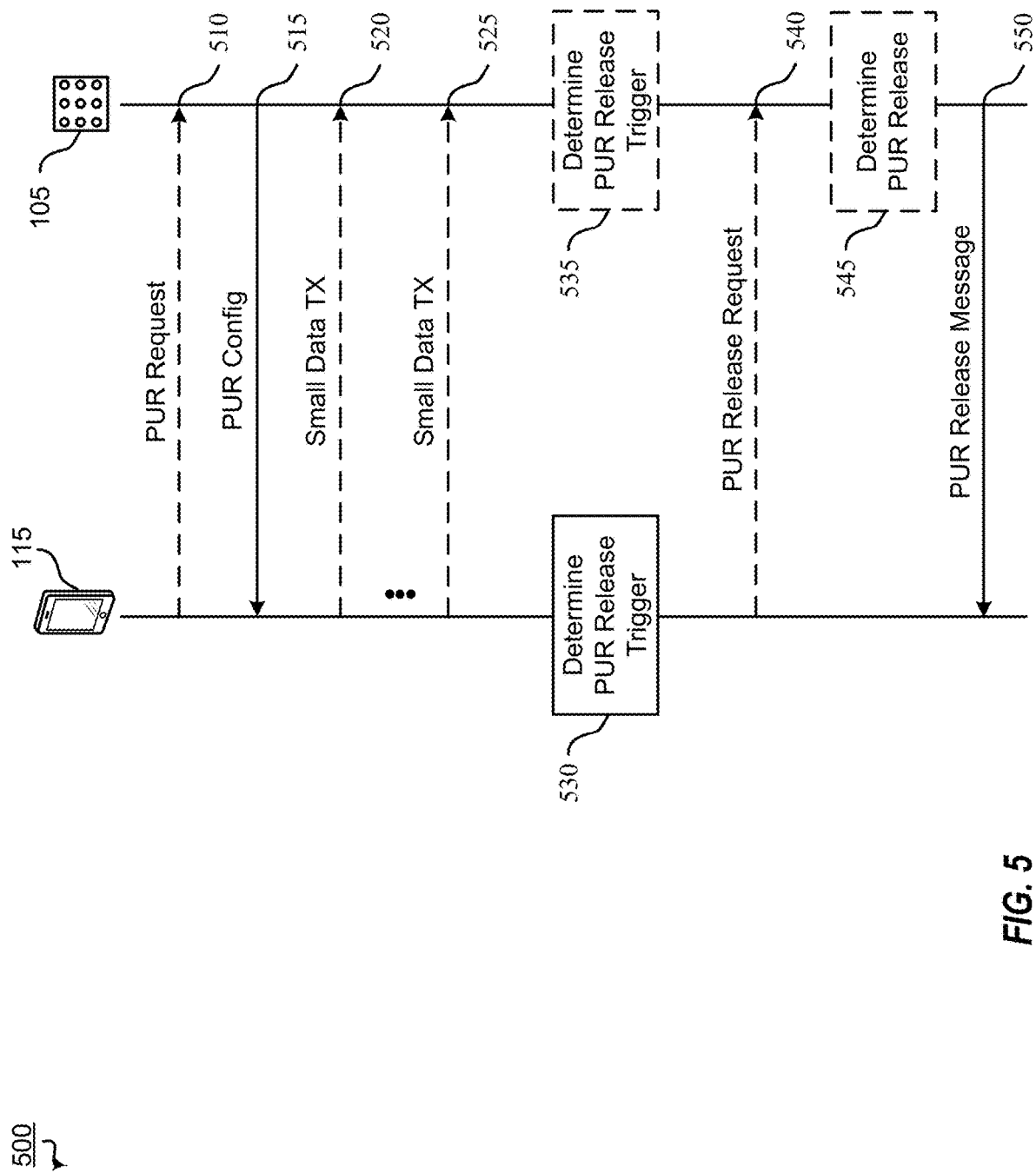
FIG. 5 is a ladder diagram of an example of PUR configuration and release operations according to some embodiments of the present disclosure.
Figure 6:
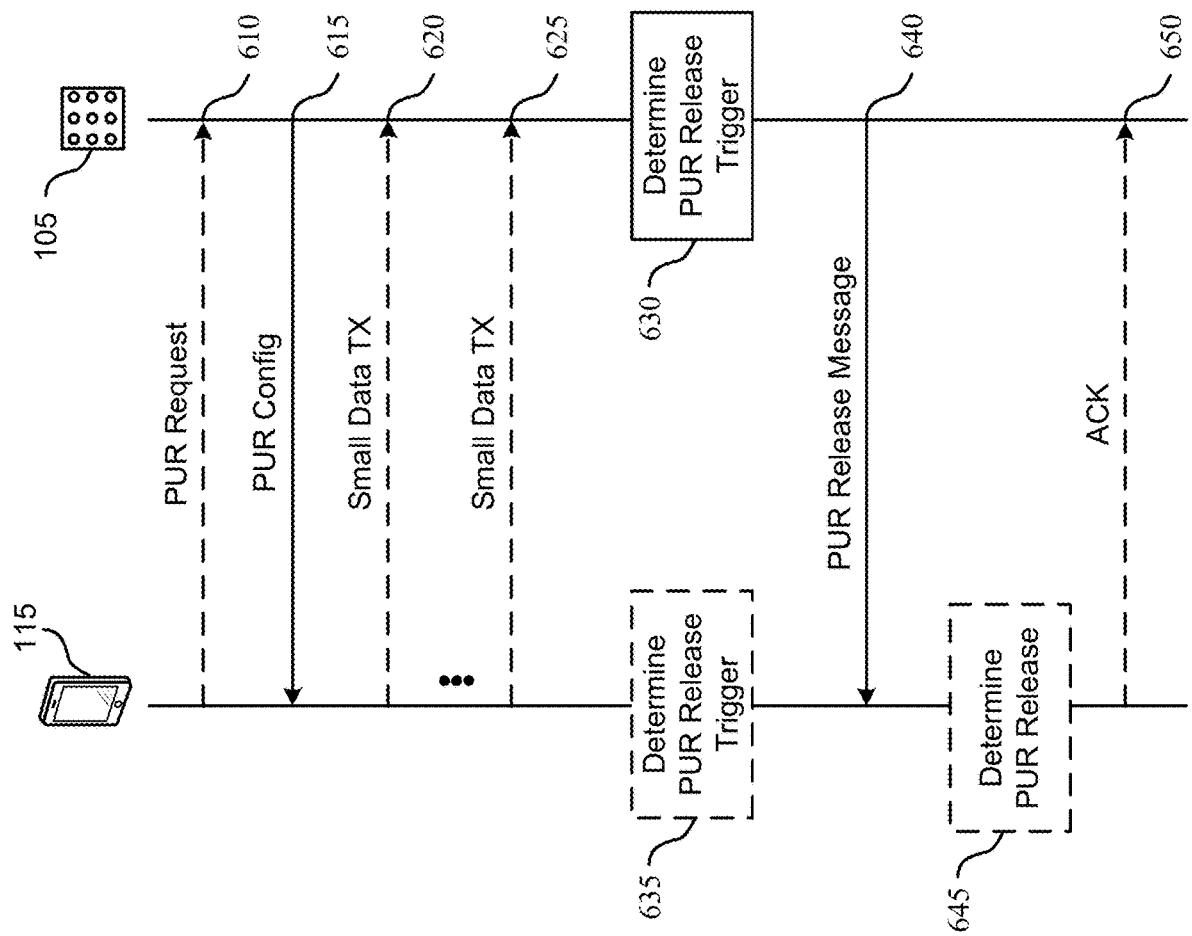
FIG. 6 is a ladder diagram of another example of PUR configuration and release operations according to some embodiments of the present disclosure.

FIGS. 5 and 6 illustrate examples of ladder diagrams for PUR configuration and release operations. Referring to FIG. 5, FIG. 5 is a ladder diagram 500 of PUR configuration and release operations for UE based or initiated PUR configuration release. In the example of FIG. 5, the ladder diagram illustrates a UE and a network entity, such as base station 105.

At 510, the UE 115 generates and transmits a PUR request message to the base station 105 (e.g., gNB). For example, the UE 115 transmits a RRC, PUCCH, or PUSCH transmission to the base station 105 requesting a PUR configuration be established. In some implementations, the UE 115 may also include or indicate a requested PUR configuration. For example, the UE 115 may include or indicate a particular PUR configuration or one or more settings for a PUR configuration, such as a number of transmit opportunities and/or occasions, a periodicity, a type of configuration (e.g., per UE or per DRB), or a combination thereof. Additionally, the UE 115 may request to enter a RRC inactive state in the PUR request message. Alternatively, the UE 115 may already be in an RRC inactive state, as in FIG. 3A, or may be in an RRC connected state and later transition to the RRC inactive state.

At 515, the base station 105 (e.g., gNB) generates and transmits a PUR request configuration message including or indicating a PUR configuration. For example, the base station 105 transmits a RRC message, such as a RRC release message, with a PUR configuration to the UE 115. For example, the UE 115 may include or indicate a particular PUR configuration or one or more settings for a PUR configuration, such as a number of transmit opportunities and/or occasions, a periodicity, or a combination thereof. Additionally, the PUR configuration may indicate that it is a per UE PUR configuration or a per DRB PUR configuration. The PUR configuration message (e.g., a RRC release message) may be further configured to transition the UE 115 from a RRC connected state to an RRC inactive state.

From 520 to 525, the UE 115 may optionally generate and transmit one or more small data transmissions to the base station 105 and using the PUR configuration received in the PUR configuration message. For example, the UE 115 may transmits one or more PUSCH transmissions to the base station 105. As illustrated in the example of FIG. 5, the UE 115 transmits a first and a second small data transmission to the base station 105. The first and second small data transmissions may occur in consecutive or non-consecutive transmit occasions and/or opportunities.

Additionally, after the PUR configuration is transmitted at 515 and set, the UE 115 and optionally the base station 105 may track one or more metrics for determining if the PUR configuration should be released. For example, the UE 115 and base station 105 may track a number of consecutive missed occasions and/or opportunities, such as with a counter. As another example the UE 115 and base station 105 may set one or more timers, such as a TA timer or a PUR timer. In addition, the UE 115 may monitor if it has completed its known or allotted small data transmissions, such as by a number of configured transmit occasions and/or opportunities being reached or if a previously identified amount small data to be transmitted has been communicated.

At 530, the UE 115 determines a particular PUR configuration release trigger. For example, the UE 115 may determine to release the PUR configuration based on one or more conditions. Such conditions include a number of configured transmit opportunities or occasions being reached, a timer conditions (e.g., TA timer condition) being satisfied, a counter condition being satisfied, a small data transmission conditions being satisfied, etc.

In some implementations, the PUR configuration release trigger condition is based on a TA timer, such as a new TA timer. For example, the UE 115 may set a TA timer based on the PUR configuration and start the new TA timer responsive to switching to RRC inactive state. The UE 115 may determine whether the new TA timer is expired, and determine to release the PUR configuration based on determining that the new TA timer is expired. In some such implementations, the TA timer being expired indicates that uplink transmissions are out of sync.

In some other implementations, the PUR configuration release trigger condition is based on a number of PUR configurations being reached (e.g., a number occasions allotted). For example, the UE 115 determine a number of allotted PUR transmit occasions based on the PUR configuration, and monitor a number of elapsed PUR transmit occasions. The UE 115 may then compare the number of allotted PUR transmit occasions to the number of elapsed PUR transmit occasions to determine whether the number of allotted PUR transmit occasions has been reached.

In some other implementations, the PUR configuration release trigger condition is based on a status of the small data transmission or transmissions. For example, the UE 115 may determine whether the small data transmission is finished, and generate a PUR release request message responsive to determining the small data transmission is finished. In such implementations, the UE 115 transmits the PUR release request message to the network entity, the PUR release request message configured to indicate release of the PUR configuration. In some aspects, the PUR release request message includes or corresponds to a MAC CE. The MAC CE can be a fixed size. In one implementation, the MAC CE has a size of zero bits. Additionally, the MAC CE may have a new Logical Channel ID (LCID). The MAC CE may include or correspond to a data request MAC CE which requests uplink resource allocation for small data transmission. Alternatively, the MAC CE may be a repurposed or reused MAC CE, such as a Small Data Request MAC CE. In a particular implementation, the Small Data Request MAC CE may include a special value to indicate the release, such as a traffic pattern indication element set to zero. In other aspects, the PUR release request message includes or corresponds to a RRC message.

In some other implementations, the PUR configuration release trigger condition is based on a timer. The UE 115 may be configured to switch to a RACH procedure for small data transmission based the timer and/or based on one or more other conditions. For example, the UE 115 may start a timer and switch to a RACH procedure for small data transmission responsive to expiration of the timer. The UE 115 may then transmit a small data transmission in a messageA or a message3. When switching to a two-step RACH procedure, the UE 115 may use messageA (MSA), and when switching to a four-step RACH procedure, the UE 115 may use message3 (msg3).

In some other implementations, the PUR configuration release trigger condition is based on a LBT counter. For example, the UE 115 may start a LBT failure counter based on the PUR configuration message. The UE 115 may increment the LBT failure counter based on each LBT failure, and reset the LBT failure counter based on a LBT success. The UE 115 then determines to release the PUR configuration release based on the LBT failure counter satisfying a number of consecutive LBT failures condition. The UE 115 may optionally generate a PUR configuration release request message based on the LBT failure counter satisfying the number of consecutive LBT failures condition. For example, the base station 105 may not be able to track (or accurately track) the LBT success and/or failure of the UE 115, and thus the UE 115 may inform the network of such a condition.

At 535, the base station 105 may optionally determine the particular PUR configuration release trigger. For example, the base station 105 may determine to release the PUR configuration based on one or more conditions. Such conditions may include similar conditions which are evaluated by the UE 115 and optionally other base station 105 focused conditions.

At 540, the UE 115 optionally generates and transmits a PUR release request message to indicate or signal a release of a particular PUR configuration. For example, in conditions where the trigger condition is UE based or UE initiated or when the base station 105 does not also monitor for the particular PUR configuration release condition, the UE 115 sends a RRC message or a MAC CE to indicate a release of the particular PUR configuration.

At 545, the base station 105 may optionally determine to release the particular PUR configuration responsive to receiving the PUR release request message. For example, the base station 105 may determine to release the PUR configuration based on an indication or request to do so in the PUR release request message.

At 550, the base station 105 generates and transmits a PUR release message. For example, the base station 105 transmits a RRC release message to the UE 115 which is configured to initiate or confirm the actual release of the PUR configuration. The UE 115 and the base station 105 may release the PUR configuration settings and cease operating according to the PUR configuration settings responsive to the PUR release message being communicated. The base station 105 and UE 115 may then attempt to establish another PUR configuration, by similar or other means. Additionally, or alternatively, the UE 115 and base station 105 may operate according to another PUR configuration, such as a default PUR configuration or another PUR configuration which was previously established and still active (e.g., not released by the above release message). Although not illustrated in FIG. 5, the UE 115 may transmit an optional acknowledgment message for the PUR release message.

Thus, in the example in FIG. 5, the devices perform UE based PUR configuration and release operations. That is, the UE can determine without signaling and optionally inform the network for a release of the PUR configuration which enables enhanced release operations and reduced spectrum waste.

Referring to FIG. 6, FIG. 6 is a ladder diagram of PUR configuration and release operations. In the example of FIG. 6, the ladder diagram illustrates a UE and a network entity, such as base station 105. As compared to the UE based or initiated PUR configuration release in the ladder diagram of FIG. 5, the ladder diagram of FIG. 6 illustrates PUR configuration and release operations for network based or initiated PUR configuration release.

At 610, the UE 115 generates and transmits a PUR request message to the base station 105 (e.g., gNB). For example, the UE 115 transmits a RRC, PUCCH, or PUSCH transmission to the base station 105 requesting a PUR configuration be established. In some implementations, the UE 115 may also include or indicate a requested PUR configuration. For example, the UE 115 may include or indicate a particular PUR configuration or one or more settings for a PUR configuration, such as a number of transmit opportunities and/or occasions, a periodicity, a type of configuration (e.g., per UE or per DRB), or a combination thereof. Additionally, the UE 115 may request to enter a RRC inactive state in the PUR request message. Alternatively, the UE 115 may already be in an RRC inactive state, as in FIG. 3A, or may be in an RRC connected state and later transition to the RRC inactive state.

At 615, the base station 105 (e.g., gNB) generates and transmits a PUR request configuration message including or indicating a PUR configuration. For example, the base station 105 transmits a RRC message, such as a RRC release message, with a PUR configuration to the UE 115. For example, the UE 115 may include or indicate a particular PUR configuration or one or more settings for a PUR configuration, such as a number of transmit opportunities and/or occasions, a periodicity, or a combination thereof. Additionally, the PUR configuration may indicate that it is a per UE PUR configuration or a per DRB PUR configuration. The PUR configuration message (e.g., a RRC release message) may be further configured to transition the UE 115 from a RRC connected state to an RRC inactive state.

From 620 to 625, the UE 115 may optionally generate and transmit one or more small data transmissions to the base station 105 and using the PUR configuration received in the PUR configuration message. For example, the UE 115 may transmits one or more PUSCH transmissions to the base station 105. As illustrated in the example of FIG. 5, the UE 115 transmits a first and a second small data transmission to the base station 105. The first and second small data transmissions may occur in consecutive or non-consecutive transmit occasions and/or opportunities.

Additionally, after the PUR configuration is transmitted at 515 and set, the base station 105 and optionally the UE 115 may track one or more metrics for determining if the PUR configuration should be released. For example, the base station 105 and the UE 115 may track a number of consecutive missed occasions and/or opportunities, such as with a counter. As another example the base station 105 and the UE 115 may set one or more timers, such as a TA timer or a PUR timer. In addition, the base station 105 may monitor if the UE 115 has completed its allotted small data transmissions, such as by a number of configured transmit occasions and/or opportunities being reached, or if a previously identified amount small data to be transmitted has been communicated.

At 630, the base station 105 determines a particular PUR configuration release trigger. For example, the base station 105 may determine to release the PUR configuration based on one or more conditions. Such conditions include a number of configured transmit opportunities or occasions being reached, a timer conditions (e.g., a TA timer condition) being satisfied, a counter condition being satisfied, a small data transmission conditions being satisfied, etc.

In some other implementations, the PUR configuration release trigger condition is based on a configuration timer. For example, the base station 105 starts the PUR configuration timer based on a first small data transmission and resets the PUR configuration timer based on a subsequent small data transmission. As another example, the base station 105 starts the PUR configuration timer based on receiving the PUR configuration message, setting the PUR configuration, or transition RRC states. The base station 105 generates the PUR configuration release message based on expiration of the PUR configuration timer.

In some other implementations, the PUR configuration release trigger condition is based on a counter. For example, the base station 105 starts a PUR configuration counter based on a first small data transmission. The base station 105 increments the PUR configuration counter based on each unused PUR transmit occasion, and resets the PUR configuration counter based on a small data transmission. The base station 105 generates the PUR configuration release message based on the PUR configuration counter satisfying a number of consecutive unused transmit occasions condition.

In some other implementations, the PUR configuration release trigger condition is based on a decision to rescind the PUR configuration. For example, the base station 105 may determine a higher priority data or device should be allotted the spectrum instead of UE 115 and its data and/or that a configuration or parameter of the UE and/or network has changed. In such implementations, the base station 105 may send a PUR release message to the UE, the PUR release message configured to indicate release of the PUR configuration. To illustrate, the base station 105 may determine to rescind the PUR configuration, and generate the PUR release message responsive to determining to rescind the PUR configuration. The PUR release message may include or correspond to a RRC message.

At 635, the UE 115 may optionally determine the particular PUR configuration release trigger. For example, the UE 115 may determine to release the PUR configuration based on one or more conditions. Such conditions may include similar conditions which are evaluated by the base station 105 and optionally other UE 115 based or focused conditions.

At 640, the base station 105 generates and transmits a PUR release message. For example, the base station 105 transmits a RRC release message to the UE 115 which is configured to initiate or confirm the actual release of the PUR configuration. The PUR release message is generated responsive to determining the particular PUR configuration release trigger at 530. The UE 115 and the base station 105 may release the PUR configuration settings and cease operating according to the PUR configuration settings responsive to the PUR release message being communicated.

As an alternative to the UE 115 determining the particular PUR configuration release trigger at 635, the UE 115, at 645, may determine to release the particular PUR configuration based on and responsive to receiving the PUR release message. For example, the UE 115 may determine to release the PUR configuration based on an indication or request to do so in the PUR release message.

At 650, the UE 115 optionally generates and transmits an acknowledgment message for the PUR release message. For example, the UE 115 transmits a RRC message, UCI, or a MAC CE to the base station 105 which is configured to confirm receipt of the PUR release message and the actual release of the PUR configuration.

The base station 105 and UE 115 may then attempt to establish another PUR configuration, by similar or other means. Additionally, or alternatively, the UE 115 and base station 105 may operate according to another PUR configuration, such as a default PUR configuration or another PUR configuration which was previously established and still active (e.g., not released by the above release message). In other implementations, the PUR release message may configure another PUR configuration, such as a PUR configuration with less bandwidth and/or spectrum allocated to the UE 115 or one that has different time constraints.

Thus, in the example in FIG. 6, the devices perform network based PUR configuration and release operations. That is, the base station can determine without signaling and optionally inform the UE for a release of the PUR configuration which enables enhanced release operations and reduced spectrum waste.

Additionally, or alternatively, one or more operations of FIGS. 3A-6 may be added, removed, substituted in other implementations. For example, in some implementations, the example steps of FIGS. 3A and 3B may be used together. To illustrate, the steps of FIG. 3B may be performed and then at a later time, the steps of 3A may be performed. As another example, some of the steps of either UE initiated release in FIG. 5 or some of the steps of network initiated release in FIG. 6 may be used with or added to the steps of either FIG. 3A or 3B.

Figures 7, 8:
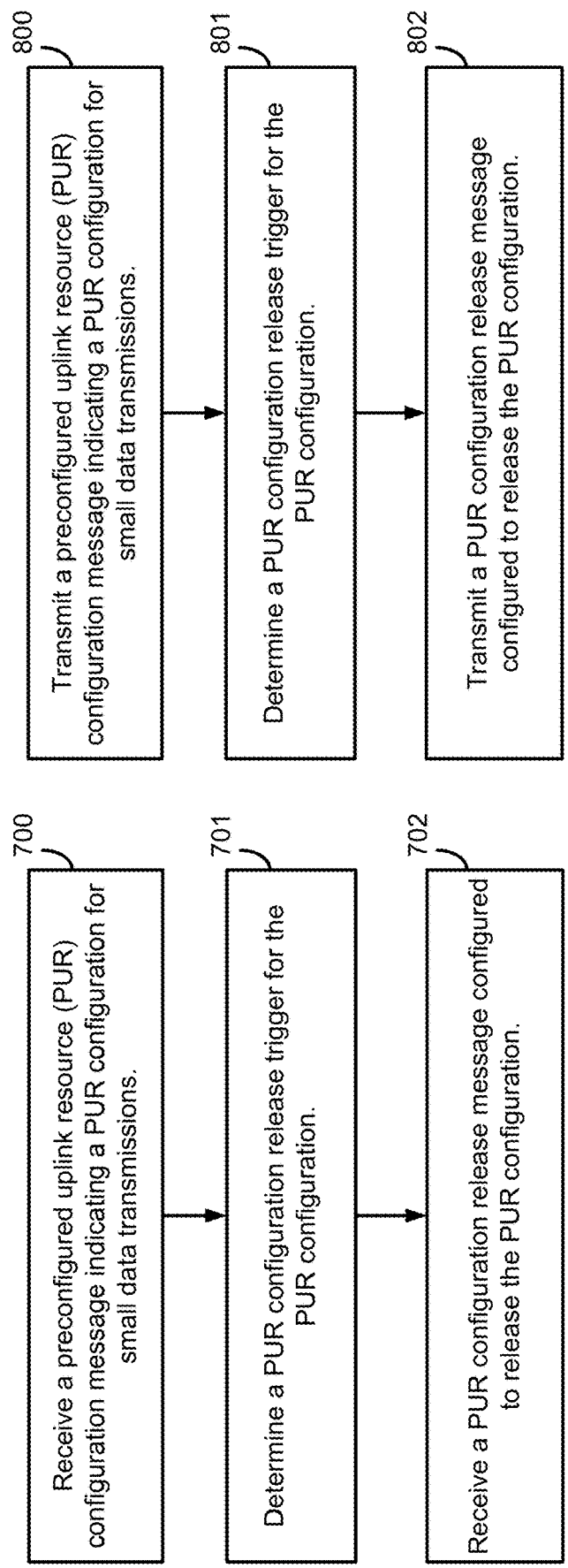
FIG. 7 is a flow diagram illustrating example blocks executed by a UE configured according to an aspect of the present disclosure.
FIG. 8 is a flow diagram illustrating example blocks executed by a base station configured according to an aspect of the present disclosure.
Figure 9:
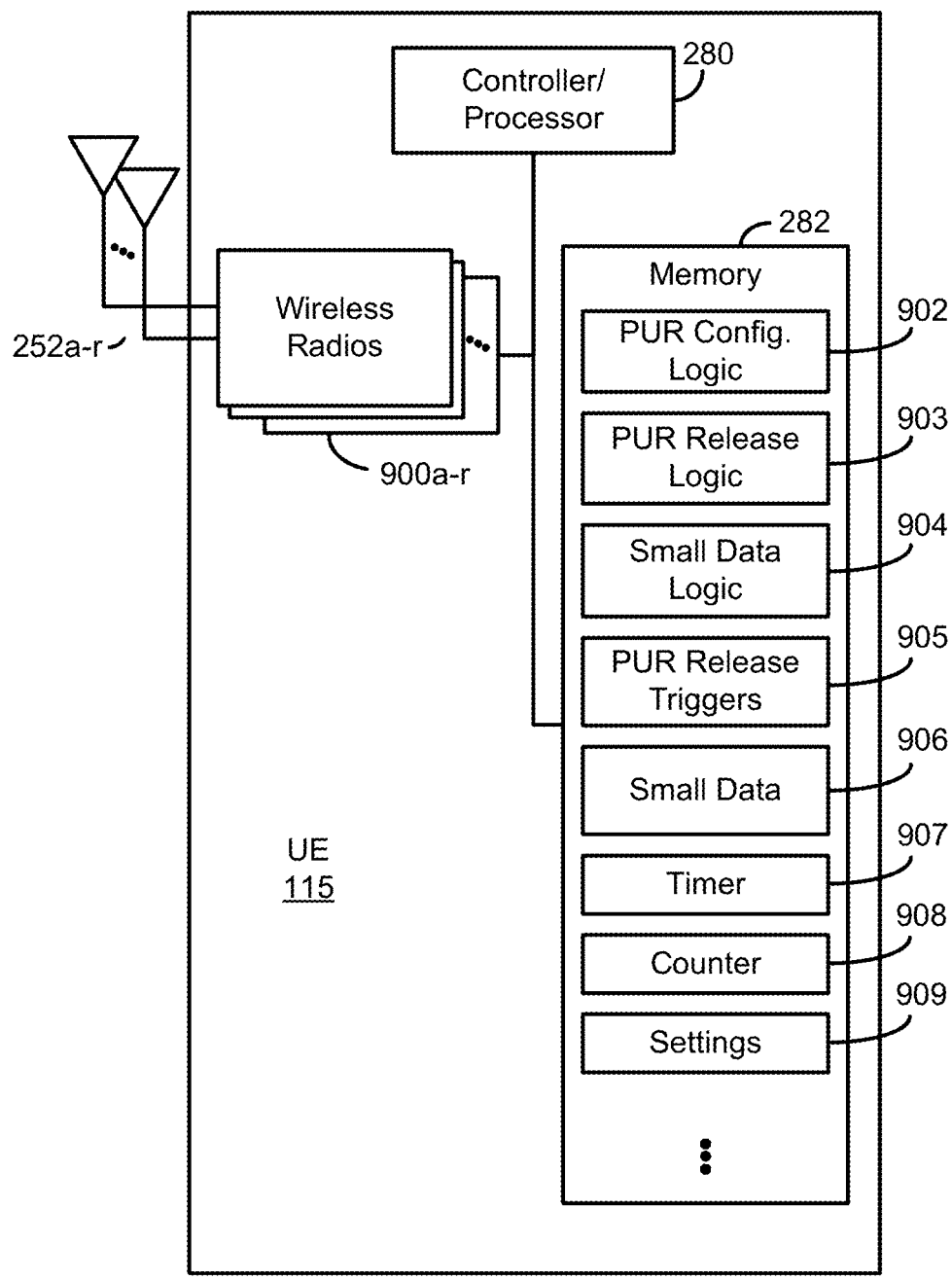
FIG. 9 is a block diagram conceptually illustrating a design of a UE configured to perform precoding information update operations according to some embodiments of the present disclosure.

FIG. 7 is a flow diagram illustrating example blocks executed by a UE configured according to an aspect of the present disclosure. The example blocks will also be described with respect to UE 115 as illustrated in FIG. 9. FIG. 9 is a block diagram illustrating UE 115 configured according to one aspect of the present disclosure. UE 115 includes the structure, hardware, and components as illustrated for UE 115 of FIG. 2. For example, UE 115 includes controller/processor 280, which operates to execute logic or computer instructions stored in memory 282, as well as controlling the components of UE 115 that provide the features and functionality of UE 115. UE 115, under control of controller/processor 280, transmits and receives signals via wireless radios 900*a-r* and antennas 252*a-r*. Wireless radios 900*a-r* includes various components and hardware, as illustrated in FIG. 2 for UE 115, including modulator/demodulators 254*a-r*, MIMO detector 256, receive processor 258, transmit processor 264, and TX MIMO processor 266. As illustrated in the example of FIG. 9, memory 282 stores PUR configuration logic 902, PUR release logic 903, small data transmission logic 904, PUR release trigger data 905, small data 906, timer(s) 907, counter(s) 908, and settings data 909.

At block 700, a wireless communication device, such as a UE, receives a preconfigured uplink resource (PUR) configuration message indicating a PUR configuration for small data transmissions. For example, the UE 115 receives a RRC message including PUR configuration data indicating a PUR configuration for small data transmission, as described with reference to FIGS. 3A-6. The PUR configuration data may indicate a PUR configuration indicator or index number, or may include data for settings of the PUR configurations, such as number transmit occasions, transmit occasions per opportunity, periodicity, per configuration type, etc., or a combination thereof. After the PUR configuration is set, the UE 115 may transmit small data transmissions in PUSCH resources configured and allotted by the PUR configuration.

At block 701, the UE 115 determines a PUR configuration release trigger for the PUR configuration. For example, the UE 115 determines to release an active PUR configuration indicated by a network based on one or more UE monitored release conditions, as described with reference to FIGS. 3A-6. To illustrate, the UE 115 may set and monitor one or more counters and/or timers. As another illustration, the UE 115 may monitor if the PUR configuration has expired or if the small data transmission(s) has/have been completed. In some such implementations, the UE 115 may send a message to the network to indicate a release condition or conditions have been satisfied. To illustrate, the UE 115 may send a PUR configuration release request message, such as a RRC message. Alternatively, the UE 115 may receive release message from the network which indicates to release the PUR configuration based on some network monitored condition, as described with reference to FIG. 8.

At block 702, the UE 115 receives a PUR configuration release message configured to release the PUR configuration. The PUR configuration release trigger may include receiving the PUR configuration release message. For example, the UE 115 receives a RRC message from the network which indicates or confirms to release the PUR configuration, as described with reference to FIGS. 3A-6.

The UE 115 may execute additional blocks (or the UE 115 may be configured further perform additional operations) in other implementations. For example, the UE 115 may perform one or more operations described above. As another example, the UE 115 may perform one or more operations as described below.

In a first aspect, prior to determining the PUR configuration release trigger: the UE 115 receives one or more SSB transmissions; selecting, by the UE, a particular SSB of the one or more SSB transmissions; determines a particular PUR transmit opportunity based on the selected SSB; and transmits, by the UE, first small data based on the PUR configuration and using the particular transmit opportunity of a first PUR transmit occasion.

In a second aspect, alone or in combination with one or more of the above aspects, the UE 115 transmits second small data based on the PUR configuration and using the particular PUR transmit opportunity of a second PUR transmit occasion.

In a third aspect, alone or in combination with one or more of the above aspects, the first and second PUR transmit occasions include PUSCH transmissions occasions, and wherein the UE is in a RRC inactive state while transmitting the first and second small data.

In a fourth aspect, alone or in combination with one or more of the above aspects, prior to receiving the PUR configuration message: the UE 115 receives dedicated RRC signaling indicating a change in RRC status (e.g., a RRC release message); transitioning, by the UE, from a RRC connected stated to a RRC inactive state based on the dedicated signaling (e.g., the RRC release message).

In a fifth aspect, alone or in combination with one or more of the above aspects, prior to receiving the PUR configuration message: the UE 115 transmits a RACH preamble message; and receives a RACH response message responsive to the RACH preamble message.

In a sixth aspect, alone or in combination with one or more of the above aspects, prior to receiving a Radio Resource Control (RRC) message including the PUR configuration message, the UE 115 transmits a PUR configuration request message based on determining that the UE has small data to transmit.

In a seventh aspect, alone or in combination with one or more of the above aspects, the PUR configuration release message is a RRC message or a MAC CE, and wherein the a PUR configuration request message is a RRC message or MAC CE.

In an eighth aspect, alone or in combination with one or more of the above aspects, the PUR configuration release trigger is a UE based trigger.

In a ninth aspect, alone or in combination with one or more of the above aspects, the UE based trigger includes a TA timer condition, a number of PUR transmit opportunity condition, a UE based trigger signal, a RACH procedure condition, or a LBT failure condition.

In a tenth aspect, alone or in combination with one or more of the above aspects, the PUR configuration release trigger is a network based trigger.

In an eleventh aspect, alone or in combination with one or more of the above aspects, the network based trigger includes a network configured timer condition, a network configured counter condition, or a network sent trigger signal.

In a twelfth aspect, alone or in combination with one or more of the above aspects, the PUR configuration indicates a number of PUR configured transmit occasions and a periodicity of the PUR configured transmit occasions.

In a thirteenth aspect, alone or in combination with one or more of the above aspects, the PUR configuration further indicates a number of transmit opportunities for each transmit occasion.

In a fourteenth aspect, alone or in combination with one or more of the above aspects, each PUR configured transmit occasion includes multiple transmit opportunities.

In a fifteenth aspect, alone or in combination with one or more of the above aspects, the PUR configuration includes one PUR transmit occasion (e.g., a one shot uplink grant resource).

In a sixteenth aspect, alone or in combination with one or more of the above aspects, the PUR configuration includes multiple PUR transmit occasions (e.g., multiple shots uplink grant resource).

In a seventeenth aspect, alone or in combination with one or more of the above aspects, the multiple PUR transmit occasions include a finite number of transmit occasions.

In an eighteenth aspect, alone or in combination with one or more of the above aspects, the multiple PUR transmit occasions include unlimited PUR transmit occasions (e.g., infinite occasions).

In a nineteenth aspect, alone or in combination with one or more of the above aspects, the unlimited PUR transmit occasions (e.g., infinite occasions) are indicated by a first value that indicates an infinite amount of transmit occasions.

In a twentieth aspect, alone or in combination with one or more of the above aspects, the unlimited PUR occasions (e.g., infinite occasions) are indicated by a lack of indication for an amount of transmit occasions.

In a twenty-first aspect, alone or in combination with one or more of the above aspects, the UE 115 sets a TA timer based on the PUR configuration; starts the TA timer responsive to the UE entering the RRC inactive state; determines whether the new TA timer is expired; and determines to release the PUR configuration based on determining that the new TA timer is expired.

In a twenty-second aspect, alone or in combination with one or more of the above aspects, the new TA timer being expired indicates that uplink transmissions are out of sync.

In a twenty-third aspect, alone or in combination with one or more of the above aspects, the UE 115 determines a number of allotted PUR transmit occasions based on the PUR configuration; monitors a number of elapsed PUR transmit occasions; and compare the number of allotted PUR transmit occasions to the number of elapsed PUR transmit occasions to determine whether the number of allotted PUR transmit occasions has been reached; where determining the PUR configuration release trigger for the PUR configuration includes determining that the number of allotted PUR transmit occasions has been reached.

In a twenty-third aspect, alone or in combination with one or more of the above aspects, the UE 115 transmits a PUR release request message to the network entity, the PUR release request message configured to indicate release of the PUR configuration.

In a twenty-fourth aspect, alone or in combination with one or more of the above aspects, the UE 115 determines the small data transmission(s) is/are finished; and generates the PUR release request message responsive to determining the small data transmission(s) is/are finished.

In a twenty-fifth aspect, alone or in combination with one or more of the above aspects, the PUR release request message includes or corresponds to a MAC CE.

In a twenty-sixth aspect, alone or in combination with one or more of the above aspects, the MAC CE has a fixed size of zero bits, and wherein the MAC CE has a new LCID.

In a twenty-seventh aspect, alone or in combination with one or more of the above aspects, the PUR release request message includes or corresponds to a data request MAC CE which requests uplink resource allocation for small data transmissions.

In a twenty-eighth aspect, alone or in combination with one or more of the above aspects, the PUR release request message includes or corresponds to a RRC message.

In a twenty-ninth aspect, alone or in combination with one or more of the above aspects, the UE 115 is configured to switch to a RACH procedure for small data transmissions based on one or more conditions, such as based on a lack of uplink resources, expiration of a timer, etc.

In a thirtieth aspect, alone or in combination with one or more of the above aspects, the UE 115 starts a timer after receiving the PUR configuration message and associated with the PUR configuration for small data transmission; transmits a first small data transmission using the PUR configuration; responsive to expiration of the timer, switches to a RACH procedure for small data transmission; and transmits a second small data transmission using a RACH resource in a messageA (MSGA) or a message3 (msg3).

In a thirty-second aspect, alone or in combination with one or more of the above aspects, the UE 115 starts a timer after receiving the PUR configuration message and associated with the PUR configuration for small data transmission; transmits a small data transmission using the PUR configuration; receives a DCI responsive to the small data transmission and indicating that the small data transmission was received; and resets the timer.

In a thirty-third aspect, alone or in combination with one or more of the above aspects, the PUR configuration includes a LBT failure counter, and further comprising: the UE 115 starts the LBT failure counter based on the PUR configuration message; increments the LBT failure counter based on each LBT failure; resets the LBT failure counter based on a LBT success; and generates a PUR configuration release request message based on the LBT failure counter satisfying a number of consecutive LBT failures condition.

In a thirty-fourth aspect, alone or in combination with one or more of the above aspects, the small data transmission includes 1000 bytes or less, 10 bytes or less, or another byte threshold.

In a thirty-fifth aspect, alone or in combination with one or more of the above aspects, the PUR configuration is per radio bearer, such as per signal radio bearer (SRB) or per data radio bearer (DRB) (e.g., per UE).

In a thirty-sixth aspect, alone or in combination with one or more of the above aspects, the UE 115 releases the PUR configuration based on the PUR configuration release trigger including receiving the PUR configuration release message, and the PUR configuration message, the PUR configuration release message, or both, comprise a Radio Resource Control (RRC) message.

In a thirty-seventh aspect, alone or in combination with one or more of the above aspects, the PUR configuration for small data transmissions comprises preconfigured uplink resources, the PUR configuration message comprises a Radio Resource Control (RRC) release message, and the UE 115 is operating in an RRC_INACTIVE mode when receiving the RRC release message. The RRC release message reconfigures or releases the preconfigured uplink resources.

In a thirty-eight aspect, alone or in combination with one or more of the above aspects, the PUR configuration for small data transmissions comprises preconfigured uplink resources, the PUR configuration release message comprises a Radio Resource Control (RRC) release message, and the UE 115 is operating in an RRC_INACTIVE mode when receiving the RRC release message. The RRC release message reconfigures or releases the preconfigured uplink resources.

Accordingly, a UE and a base station may perform PUR configuration and release operations. By performing PUR configuration and release operations, throughput and reliability may be increased and such operations may be compatible with reduced capability (e.g., less advanced) devices.

Figure 10:
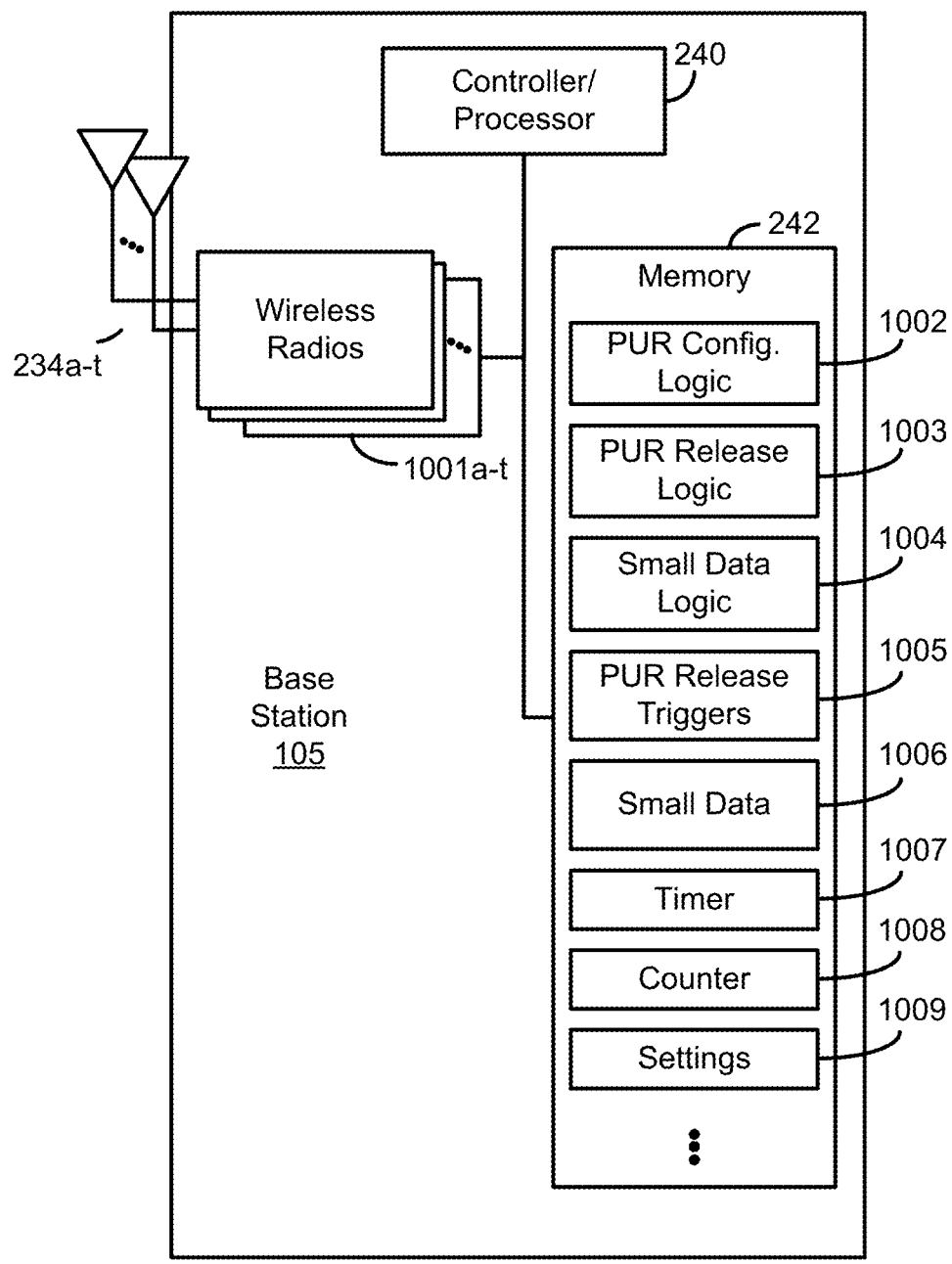
FIG. 10 is a block diagram conceptually illustrating a design of a base station configured to perform precoding information update operations according to some embodiments of the present disclosure.

FIG. 8 is a flow diagram illustrating example blocks executed by wireless communication device configured according to another aspect of the present disclosure. The example blocks will also be described with respect to base station 105 (e.g., gNB) as illustrated in FIG. 10. FIG. 10 is a block diagram illustrating base station 105 configured according to one aspect of the present disclosure. Base station 105 includes the structure, hardware, and components as illustrated for base station 105 of FIG. 2. For example, base station 105 includes controller/processor 240, which operates to execute logic or computer instructions stored in memory 242, as well as controlling the components of base station 105 that provide the features and functionality of base station 105. Base station 105, under control of controller/processor 240, transmits and receives signals via wireless radios 1001a-t and antennas 234a-t. Wireless radios 1001a-t includes various components and hardware, as illustrated in FIG. 2 for base station 105, including modulator/demodulators 232a-t, MIMO detector 236, receive processor 238, transmit processor 220, and TX MIMO processor 230. As illustrated in the example of FIG. 10, memory 242 stores PUR configuration logic 1002, PUR release logic 1003, small data transmission logic 1004, PUR release trigger data 1005, small data 1006, timer(s) 1007, counter(s) 1008, and settings data 1009. One of more of 1002-1009 may include or correspond to one of 902-902.

At block 800, a wireless communication device, such as a base station, transmits a preconfigured uplink resource (PUR) configuration message indicating a PUR configuration for small data transmissions. For example, the base station 105 transmits a RRC message including PUR configuration data indicating a PUR configuration for small data transmission, as described with reference to FIGS. 3A-6. The PUR configuration data may indicate a PUR configuration indicator or index number, or may include data for settings of the PUR configurations, such as number transmit occasions, transmit occasions per opportunity, periodicity, per configuration type, etc., or a combination thereof. After the PUR configuration is set, the UE 115 may transmit small data transmissions in PUSCH resources configured and allotted by the PUR configuration.

At block 801, the base station 105 determines a PUR configuration release trigger for the PUR configuration. For example, the base station 105 determines to release an active PUR configuration for a UE based on one or more network monitored release conditions, as described with reference to FIGS. 3A-6. To illustrate, the base station 105 may set and monitor one or more counters and/or timers. As another illustration, the base station 105 may monitor if the PUR configuration has expired or if the small data transmission has been completed. In some such implementations, the base station 105 may receive a message from the UE 115 which indicates a UE release condition or conditions have been satisfied. To illustrate, the UE 115 may send a PUR configuration release request message, such as a RRC message, to the base station 105.

At block 802, the base station 105 transmits a PUR configuration release message configured to release the PUR configuration. For example, the base station 105 transmits a RRC message which indicates or confirms to release the PUR configuration for the UE, as described with reference to FIGS. 3A-6.

The base station 105 may execute additional blocks (or the base station 105 may be configured further perform additional operations) in other implementations. For example, the base station 105 may perform one or more operations described above, including such actions as described in FIG. 7 and as attributed to the UE 115. As another example, the base station 105 may perform one or more aspects described below and/or with reference to FIG. 7.

In a first aspect, the PUR configuration includes a PUR configuration timer, and the base station 105 starts the PUR configuration timer based on a first small data transmission; resets the PUR configuration timer based on a subsequent small data transmission; and generates the PUR configuration release message based on expiration of the PUR configuration timer.

In a second aspect, alone or in combination with one or more of the above aspects, the UE 115 the PUR configuration includes a PUR configuration counter, and the base station 105 starts the PUR configuration counter based on a first small data transmission; increments the PUR configuration counter based on each unused PUR transmit occasion; resets the PUR configuration counter based on a small data transmission; and generates the PUR configuration release message based on the PUR configuration counter satisfying a number of consecutive unused transmit occasions condition.

In a third aspect, alone or in combination with one or more of the above aspects, the UE 115 transmits a PUR release request message to the UE, the PUR release request message configured to indicate release of the PUR configuration.

In a fourth aspect, alone or in combination with one or more of the above aspects, the PUR release request message includes or corresponds to a RRC message.

In a fifth aspect, alone or in combination with one or more of the above aspects, the UE 115 determines to rescind the PUR configuration; and generates the PUR release request message responsive to determining to rescind the PUR configuration.

Accordingly, a UE and a base station may perform PUR configuration and release operations. By performing PUR configuration and release operations, throughput and reliability may be increased and such operations may be compatible with reduced capability (e.g., less advanced) devices.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The functional blocks and modules in FIGS. 7 and 8 may comprise processors, electronics devices, hardware devices, electronics components, logical circuits, memories, software codes, firmware codes, etc., or any combination thereof.

Those of skill would further appreciate that the various illustrative logical blocks, modules, circuits, and algorithm steps described in connection with the disclosure herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Skilled artisans will also readily recognize that the order or combination of components, methods, or interactions that are described herein are merely examples and that the components, methods, or interactions of the various aspects of the present disclosure may be combined or performed in ways other than those illustrated and described herein.

The various illustrative logical blocks, modules, and circuits described in connection with the disclosure herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of a method or algorithm described in connection with the disclosure herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

In one or more exemplary designs, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. Computer-readable storage media may be any available media that can be accessed by a general purpose or special purpose computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code means in the form of instructions or data structures and that can be accessed by a general-purpose or special-purpose computer, or a general-purpose or special-purpose processor. Also, a connection may be properly termed a computer-readable medium. For example, if the software is transmitted from a website, server, or other remote source using a coaxial cable, fiber optic cable, twisted pair, or digital subscriber line (DSL), then the coaxial cable, fiber optic cable, twisted pair, or DSL, are included in the definition of medium. Disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination. Also, as used herein, including in the claims, "or" as used in a list of items prefaced by "at least one of" indicates a disjunctive list such that, for example, a list of "at least one of A, B, or C" means A or B or C or AB or AC or BC or ABC (i.e., A and B and C) or any of these in any combination thereof.

The previous description of the disclosure is provided to enable any person skilled in the art to make or use the disclosure. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein but is to be accorded the widest scope consistent with the principles and novel features disclosed herein.

What is claimed is:

1. An apparatus configured for wireless communication, comprising:
   at least one processor; and
   a memory coupled to the at least one processor,
   wherein the at least one processor is configured to:
      receive a configuration message, wherein the configuration message includes a preconfigured uplink resource (PUR) configuration for small data transmissions, wherein the PUR configuration comprises preconfigured uplink resources; and
      release the preconfigured uplink resources based on a PUR release trigger, wherein the PUR release trigger includes satisfaction of a condition corresponding to a timing advance (TA) timer.

2. The apparatus of claim 1, wherein the configuration message comprises a Radio Resource Control (RRC) release message, wherein, to receive the configuration message, the at least one processor is configured to receive the RRC release message in an RRC inactive mode, and wherein the RRC release message is configured to reconfigure the preconfigured uplink resources or release prior preconfigured uplink resources.

3. The apparatus of claim 1, wherein the at least one processor is further configured to:
   receive one or more Synchronization Signal Block (SSB) transmissions; and
   transmit, during a particular PUR transmit opportunity corresponding to a first PUR transmit occasion based on a particular SSB of the one or more SSBs, first small data based on the PUR configuration.

4. The apparatus of claim 3, wherein the at least one processor is further configured to:
   transmit, during the particular PUR transmit opportunity corresponding to a second PUR transmit occasion based on a second particular SSB of the one or more SSBs, second small data based on the PUR configuration.

5. The apparatus of claim 4, wherein the first and second PUR transmit occasions are PUSCH transmit occasions, and wherein, to transmit the first and second small data, the at least one processor is configured to transmit the first and second small data while in a Radio Resource Control (RRC) inactive state.

6. The apparatus of claim 1, wherein, prior to the receipt of the configuration message, the at least one processor is further configured to:
receive Radio Resource Control (RRC) signaling indicating a change in RRC status; and
transition from an RRC connected stated to an RRC inactive state based on the RRC signaling.

7. The apparatus of claim 1, wherein, prior to the receipt of the configuration message, the at least one processor is further configured to:
transmit a Random Access Channel (RACH) preamble message; and
receive a RACH response message responsive to the RACH preamble message.

8. The apparatus of claim 7, wherein, prior to the receipt of a Radio Resource Control (RRC) message including the configuration message, the at least one processor is further configured to:
transmit a PUR configuration request message based on availability of small data for transmission by the at least one processor.

9. The apparatus of claim 7, wherein the configuration message is a Radio Resource Control (RRC) message or a MAC CE.

10. The apparatus of claim 1, wherein the PUR configuration indicates a number of PUR configured transmit occasions and a periodicity of the PUR configured transmit occasions.

11. The apparatus of claim 1, wherein the PUR configuration includes one PUR transmit occasion or multiple PUR transmit occasions.

12. The apparatus of claim 11, wherein the PUR configuration includes the multiple PUR transmit occasions, and wherein the multiple PUR transmit occasions include a finite number of transmit occasions.

13. The apparatus of claim 11, wherein the PUR configuration includes the multiple PUR transmit occasions, wherein the multiple PUR transmit occasions include unlimited PUR transmit occasions, and wherein the unlimited PUR transmit occasions are indicated by a first value that indicates an infinite amount of transmit occasions or the unlimited PUR occasions are indicated by a lack of indication for an amount of transmit occasions.

14. The apparatus of claim 1, wherein the at least one processor is further configured to:
set the TA timer based on the PUR configuration; and
start the TA timer responsive to the apparatus entering a Radio Resource Control (RRC) inactive state, wherein the condition corresponding to the TA timer includes expiration of the TA timer.

15. The apparatus of claim 1, wherein the at least one processor is further configured to:
transmit a PUR release request message, the PUR release request message configured to indicate release of the preconfigured uplink resources.

16. The apparatus of claim 15, wherein the at least one processor is further configured to:
determine the small data transmissions are finished; and
generate the PUR release request message responsive to the determination that the small data transmissions are finished.

17. The apparatus of claim 15, wherein the PUR release request message includes or corresponds to a MAC CE, and wherein the MAC CE has a fixed size of zero bits, and wherein the MAC CE has a Logical Channel ID (LCID).

18. The apparatus of claim 15, wherein the PUR release request message includes or corresponds to a data request MAC CE which requests uplink resource allocation for small data transmission or to a Radio Resource Control (RRC) message.

19. The apparatus of claim 1, wherein the at least one processor is further configured to switch to a Random Access Channel (RACH) procedure for small data transmission based on a lack of uplink resources, expiration of a timer, one or more other conditions, or a combination thereof.

20. The apparatus of claim 1, wherein the at least one processor is further configured to:
start the TA timer after the receipt of the configuration message;
transmit a first small data transmission using the PUR configuration;
switch, based on the satisfaction of the condition corresponding to the TA timer, to a Random Access Channel (RACH) procedure for small data transmission; and
transmit a second small data transmission using a RACH resource in a messageA (MSGA) or a message3 (msg3).

21. The apparatus of claim 1, wherein the small data transmissions each include a quantity of bytes less than a threshold, and wherein the threshold is 1000 bytes or less.

22. The apparatus of claim 1, wherein PUR configuration is per radio bearer.

23. The apparatus of claim 1, wherein the at least one processor is further configured to:
set the TA timer based on the PUR configuration.

24. The apparatus of claim 1, wherein the at least one processor is further configured to:
start the TA timer after entering a Radio Resource Control (RRC) inactive state.

25. The apparatus of claim 1, wherein the condition corresponding to the TA timer includes expiration of the TA timer.

26. The apparatus of claim 1, wherein the at least one processor is further configured to:
start the TA timer after the receipt of the configuration message.

27. The apparatus of claim 1, wherein the at least one processor is further configured to:
transmit, prior to the satisfaction of the condition corresponding to the TA timer, a first small data transmission using the PUR configuration;
switch, based on the satisfaction of the condition corresponding to the TA timer, to a Random Access Channel (RACH) procedure for small data transmission; and
transmit a second small data transmission using a RACH resource in a messageA (MSGA) or a message3 (msg3).

28. A method of wireless communication performed by an apparatus, comprising:
receiving a configuration message, wherein the configuration message includes a preconfigured uplink resource (PUR) configuration for small data transmissions, wherein the PUR configuration comprises preconfigured uplink resources; and
releasing the preconfigured uplink resources based on a PUR release trigger, wherein the PUR release trigger includes satisfaction of a condition corresponding to a timing advance (TA) timer.

29. A non-transitory, computer-readable medium having instructions stored thereon that, when executed by a processor, cause the processor to perform operations comprising:

receiving, by a user equipment (UE), a configuration message, wherein the configuration message includes a preconfigured uplink resource (PUR) configuration for small data transmissions, wherein the PUR configuration comprises preconfigured uplink resources; and releasing, by the UE, the preconfigured uplink resources based on a PUR release trigger, wherein the PUR release trigger includes satisfaction of a condition corresponding to a timing advance (TA) timer.

* * * * *